United States Patent
Radulescu et al.

(10) Patent No.: US 9,648,509 B2
(45) Date of Patent: May 9, 2017

(54) METHOD AND APPARATUS FOR PROVIDING ENHANCED INTERFERENCE MANAGEMENT AT RESTRICTED ACCESS POINTS

(71) Applicant: QUALCOMM Incorporated, San Diego, CA (US)

(72) Inventors: Andrei Dragos Radulescu, San Diego, CA (US); Mehmet Yavuz, San Diego, CA (US); Damanjit Singh, San Diego, CA (US); Farhad Meshkati, San Diego, CA (US); Jen Mei Chen, San Diego, CA (US); Gavin Bernard Horn, La Jolla, CA (US); Sanjiv Nanda, Ramona, CA (US); Peerapol Tinnakornsrisuphap, San Diego, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 14/281,541

(22) Filed: May 19, 2014

(65) Prior Publication Data
US 2015/0018042 A1    Jan. 15, 2015

Related U.S. Application Data

(62) Division of application No. 13/084,125, filed on Apr. 11, 2011, now Pat. No. 8,731,550.
(Continued)

(51) Int. Cl.
*H04W 24/00* (2009.01)
*H04W 24/10* (2009.01)
(Continued)

(52) U.S. Cl.
CPC ............ *H04W 24/10* (2013.01); *H04W 4/06* (2013.01); *H04W 24/08* (2013.01);
(Continued)

(58) Field of Classification Search
CPC ....... H04W 24/10; H04W 4/06; H04W 24/08; H04W 52/243; H04W 4/08; H04W 48/02; H04W 84/045; H04W 88/08
(Continued)

(56) References Cited

U.S. PATENT DOCUMENTS

2009/0070694 A1    3/2009   Ore et al.
2009/0086861 A1*   4/2009   Yavuz ................. H04W 52/367
                                                       375/346
(Continued)

FOREIGN PATENT DOCUMENTS

DE    WO2011/101026    *   2/2010   ............ H04W 24/10

OTHER PUBLICATIONS

3GPP, "Enhanced Interference Management for Home NodeBs." 3GPP Work Item Description, RP-100392, 2010, 5pp.
(Continued)

*Primary Examiner* — Mong-Thuy Tran
(74) *Attorney, Agent, or Firm* — Changwoo Yang

(57) ABSTRACT

Methods and apparatuses are provided that facilitate providing access point measurements to restricted access points. Restricted access points can lessen restrictions to allow devices to register with the restricted access point for providing measurements thereto. Additionally or alternatively, access point measurements can be provided to a minimization of drive tests (MDT) server for providing to the restricted access points. Thus, restricted access points can obtain the access point measurements for performing enhanced interference management or other functionality based at least in part on the measurements.

20 Claims, 21 Drawing Sheets

Related U.S. Application Data

(60) Provisional application No. 61/323,263, filed on Apr. 12, 2010, provisional application No. 61/332,553, filed on May 7, 2010.

(51) Int. Cl.
| | |
|---|---|
| *H04W 4/06* | (2009.01) |
| *H04W 24/08* | (2009.01) |
| *H04W 52/24* | (2009.01) |
| *H04W 4/08* | (2009.01) |
| *H04W 48/02* | (2009.01) |
| *H04W 84/04* | (2009.01) |
| *H04W 88/08* | (2009.01) |

(52) U.S. Cl.
CPC ............ *H04W 52/243* (2013.01); *H04W 4/08* (2013.01); *H04W 48/02* (2013.01); *H04W 84/045* (2013.01); *H04W 88/08* (2013.01)

(58) Field of Classification Search
USPC .................................. 455/561, 434, 436, 423
See application file for complete search history.

(56) References Cited

U.S. PATENT DOCUMENTS

| | | | | |
|---|---|---|---|---|
| 2009/0129291 | A1* | 5/2009 | Gupta | H04W 8/26 370/254 |
| 2009/0252099 | A1* | 10/2009 | Black | H04W 72/085 370/329 |
| 2010/0227611 | A1* | 9/2010 | Schmidt | H04W 76/025 455/434 |
| 2011/0159898 | A1* | 6/2011 | Venkatachalam | H04W 52/10 455/501 |
| 2011/0250910 | A1* | 10/2011 | Lee | H04W 24/10 455/466 |
| 2011/0269468 | A1* | 11/2011 | Sundell | H04W 36/26 455/436 |
| 2012/0015681 | A1* | 1/2012 | Dalsgaard | H04W 48/08 455/517 |
| 2012/0094660 | A1 | 4/2012 | Radulescu et al. | |
| 2012/0250565 | A1* | 10/2012 | Zhang | H04J 11/0053 370/252 |
| 2012/0282968 | A1* | 11/2012 | Toskala | H04W 24/10 455/517 |
| 2013/0021940 | A1* | 1/2013 | Keskitalo | H04W 36/0088 370/252 |
| 2013/0034013 | A1* | 2/2013 | Jung | H04W 24/08 370/252 |
| 2013/0064120 | A1* | 3/2013 | Bodog | H04W 24/10 370/252 |

OTHER PUBLICATIONS

3GPP TR 25.967 9.0.0 (May 2009), 3rd Generation Partnership Project; Technical Specification Group Radio Access Networks; Home Node B Radio Frequency (RF) Requirements (FDD) (Release 9), pp. 1-55.

3GPP TS 25.467 V9.1.0 (May 2009), 3rd Generation Partnership Project; Technical Specification Group Radio Access Network; UTRAN architecture for 3G Home Node B (HNB); Stage 2 (Release 9), pp. 1-32.

3GPP TSG RAN#45 RP-090733; Study on Enhanced Interference Management Mechanisms for HNBs, Source: Rapporteur, Qualcomm, Farhad Meshkati, Seville, Spain, Sep. 15-18, 2009, 2 Pages.

"3rd Generation Partnership Project; Technical Specification Group Radio Access Network; Study on Minimization of drive-tests in Next Generation Networks; (Release 9)", 3GPP Standard; 3GPP TR 36.805, 3rd Generation Partnership Project (3GPP), Mobile Competence Centre ; 650, Route Des Lucioles ; F-06921 Sophia-Antipolis Cedex ; France, No. V9.0.0, Dec. 21, 2009 (Dec. 21, 2009), pp. 1-24, XP050401520, [retrieved on Dec. 21, 2009]

International Search Report and Written Opinion—PCT/US2011/032142—ISA/EPO—Nov. 30, 2011.

Motorola: "Text proposal for TR 36.9xx: Reducing HeNB interference by dynamically changing HeNB access mode", 3GPP Draft; R4-094688_DYNHENB_AMCHG_IM, 3rd Generation Partnership Project (3GPP), Mobile Competence Centre ; 650, Route Des Lucioles ; F-06921 Sophia-Antipolis Cedex ; France, No. Jeju; 20091109, Nov. 9, 2009 (Nov. 9, 2009), XP050394167, the whole document.

Picochip Designs: "Optimization of HeNB DL Power Setting", 3GPP Draft; R4-093669 Downlink HENB ENB Power Optimisation, 3rd Generation Partnership Project (3GPP), Mobile Competence Centre ; 650, Route Des Lucioles ; F-06921 Sophia-Antipolis C.edex ; France, No. Miyazaki; 20091012, Oct. 12, 2009 (Oct. 12, 2009), XP050393280, the whole document.

Taiwan Search Report—TW100112701—TIPO—Oct. 24, 2014.

* cited by examiner

METHOD AND APPARATUS FOR PROVIDING ENHANCED INTERFERENCE MANAGEMENT AT RESTRICTED ACCESS POINTS

CLAIM OF PRIORITY UNDER 35 U.S.C. §120

The present Application for Patent is a Divisional of patent application Ser. No. 13/084,125 entitled "METHOD AND APPARATUS FOR PROVIDING ENHANCED INTERFERENCE MANAGEMENT AT RESTRICTED ACCESS POINTS" filed Apr. 11, 2011, which claims priority to Provisional Application No. 61/323,263 entitled "ENHANCED INTERFERENCE MANAGEMENT FOR HOME NODE Bs" filed Apr. 12, 2010, and to Provisional Application No. 61/332,553 entitled "AUTONOMOUS FEMTO ENHANCED INTERFERENCE MANAGEMENT" filed May 7, 2010, all of which are assigned to the assignee hereof and hereby expressly incorporated by reference herein.

BACKGROUND

Field

The following description relates generally to wireless network communications, and more particularly to controlling interference between restricted access points.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional restricted access points can be deployed to provide more robust wireless coverage to mobile devices. For example, wireless relay stations and low power base stations (e.g., which can be commonly referred to as Home NodeBs or Home eNBs, collectively referred to as H(e)NBs, femto access points, femtocells, picocells, microcells, etc.) can be deployed for incremental capacity growth, richer user experience, in-building or other specific geographic coverage, and/or the like. In some configurations, such low power base stations are connected to the Internet and the mobile operator's network via broadband connection (e.g., digital subscriber line (DSL) router, cable or other modem, etc.). Some H(e)NBs provide closed subscriber group (CSG) access that restricts access to certain devices or related users that are members of the CSG. This can impede enhanced interference management or other processes that benefit from device reporting at the H(e)NBs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with allowing reporting of device measurement information at restricted access points. For example, the measurement information can be made available to the restricted access points to facilitate enhanced interference management (EIM). In one example, minimization of drive tests (MDT) functionality can be utilized to allow devices to perform measurements related to restricted access points and report measurement information to an MDT server/service. The MDT server/service can then make the measurement information available to one or more restricted access points (e.g., and/or a management server for the access points) for performing EIM based on the measurement information. In another example, the restricted access points can initialize training periods, during which the restricted access points can at least temporarily allow some level of access to devices that are not typically authorized to communicate with the restricted access points. Thus, the devices can register with the restricted access points during the training periods to report measurement information relating to the restricted access points.

According to an example, a method for providing closed subscriber group (CSG) access is provided including providing wireless network access to one or more devices where the one or more devices are members of a CSG and determining a period of time during which to allow registration from one or more other devices that are not members of the CSG. The method further includes receiving access point measurement information from the one or more other devices during the period of time.

In another aspect, an apparatus for providing CSG access is provided. The apparatus includes at least one processor configured to provide wireless network access to one or more devices where the one or more devices are members of a CSG and determine a period of time during which to allow registration from one or more other devices that are not members of the CSG. The at least one processor is further configured to receive access point measurement information from the one or more other devices during the period of time. The apparatus also includes a memory coupled to the at least one processor.

In yet another aspect, an apparatus for providing CSG access is provided that includes means for providing wireless network access to one or more devices where the one or more devices are members of a CSG and means for determining a period of time during which to allow registration from one or more other devices that are not members of the CSG. The apparatus further includes means for receiving access point measurement information from the one or more other devices during the period of time.

Still, in another aspect, a computer-program product for providing CSG access is provided including a computer-readable medium having code for causing at least one computer to provide wireless network access to one or more devices where the one or more devices are members of a CSG and code for causing the at least one computer to determine a period of time during which to allow registration from one or more other devices that are not members of the CSG. The computer-readable medium further includes code for causing the at least one computer to receive access point measurement information from the one or more other devices during the period of time.

Moreover, in an aspect, an apparatus for providing CSG access is provided that includes an access mode component for providing wireless network access to one or more devices where the one or more devices are members of a CSG and a training period determining component for determining a period of time during which to allow registration from one or more other devices that are not members of the CSG. The apparatus further includes a measurement receiving component for receiving access point measurement information from the one or more other devices during the period of time.

According to another example, a method for reporting access point measurements to restricted access points is provided. The method includes performing one or more measurements of a signal from a restricted access point. The method further includes generating a MDT log comprising the one or more measurements along with a related cell identifier and reporting the MDT log to an MDT service.

In another aspect, an apparatus for reporting access point measurements to restricted access points is provided. The apparatus includes at least one processor configured to perform one or more measurements of a signal from a restricted access point. The at least one processor is further configured to generate a MDT log comprising the one or more measurements along with a related cell identifier and report the MDT log to an MDT service. The apparatus also includes a memory coupled to the at least one processor.

In yet another aspect, an apparatus for reporting access point measurements to restricted access points is provided that includes means for performing one or more measurements of a signal from a restricted access point. The apparatus further includes means for generating a MDT log comprising the one or more measurements along with a related cell identifier and means for reporting the MDT log to an MDT service.

Still, in another aspect, a computer-program product for reporting access point measurements to restricted access points is provided including a computer-readable medium having code for causing at least one computer to perform one or more measurements of a signal from a restricted access point. The computer-readable medium further includes code for causing the at least one computer to generate a MDT log comprising the one or more measurements along with a related cell identifier and code for causing the at least one computer to report the MDT log to an MDT service.

Moreover, in an aspect, an apparatus for reporting access point measurements to restricted access points is provided that includes an access point measuring component for performing one or more measurements of a signal from a restricted access point. The apparatus further includes a MDT logging component for generating a MDT log comprising the one or more measurements along with a related cell identifier and a MDT reporting component for communicating the MDT log to an MDT service.

According to yet another example, a method for performing EIM is provided that includes receiving one or more access point measurements from a MDT service and utilizing the one or more access point measurements in performing an EIM.

In another aspect, an apparatus for performing EIM is provided. The apparatus includes at least one processor configured to receive one or more access point measurements from a MDT service. The at least one processor is further configured to utilize the one or more access point measurements in performing an EIM. The apparatus also includes a memory coupled to the at least one processor.

In yet another aspect, an apparatus for performing EIM is provided that includes means for receiving one or more access point measurements from a MDT service. The apparatus further includes means for utilizing the one or more access point measurements in performing an EIM.

Still, in another aspect, a computer-program product for performing EIM is provided including a computer-readable medium having code for causing at least one computer to receive one or more access point measurements from a MDT service. The computer-readable medium further includes code for causing the at least one computer to utilize the one or more access point measurements in performing an EIM.

Moreover, in an aspect, an apparatus for performing EIM is provided that includes a measurement receiving component for receiving one or more access point measurements from a MDT service. The apparatus further includes an EIM component for utilizing the one or more access point measurements in performing an EIM.

In yet another example, a method for providing measurements to restricted access points is provided. The method includes receiving a MDT log comprising one or more access point measurements from a device and providing at least one of the one or more access point measurements from the MDT log to a restricted access point based at least in part on determining a cell identifier in the at least one of the one or more access point measurements.

In another aspect, an apparatus for providing measurements to restricted access points is provided. The apparatus includes at least one processor configured to receive a MDT log comprising one or more access point measurements from a device. The at least one processor is further configured to provide at least one of the one or more access point measurements from the MDT log to a restricted access point based at least in part on determining a cell identifier in the at least one of the one or more access point measurements. The apparatus also includes a memory coupled to the at least one processor.

In yet another aspect, an apparatus for providing measurements to restricted access points is provided that includes means for receiving a MDT log comprising one or more access point measurements from a device. The apparatus further includes means for providing at least one of the one or more access point measurements from the MDT log to a restricted access point based at least in part on determining a cell identifier in the at least one of the one or more access point measurements.

Still, in another aspect, a computer-program product for providing measurements to restricted access points is provided including a computer-readable medium having code for causing at least one computer to receive a MDT log comprising one or more access point measurements from a device. The computer-readable medium further includes code for causing the at least one computer to provide at least one of the one or more access point measurements from the MDT log to a restricted access point based at least in part on determining a cell identifier in the at least one of the one or more access point measurements.

Moreover, in an aspect, an apparatus for providing measurements to restricted access points is provided that includes a MDT receiving component for receiving a MDT log comprising one or more access point measurements from a device. The apparatus further includes a measurement providing component for providing at least one of the one or more access point measurements from the MDT log to a restricted access point based at least in part on determining a cell identifier in the at least one of the one or more access point measurements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 3 is an example message flow diagram of an aspect of performing access control for active hand-in.

DETAILED DESCRIPTION

Figure 1:
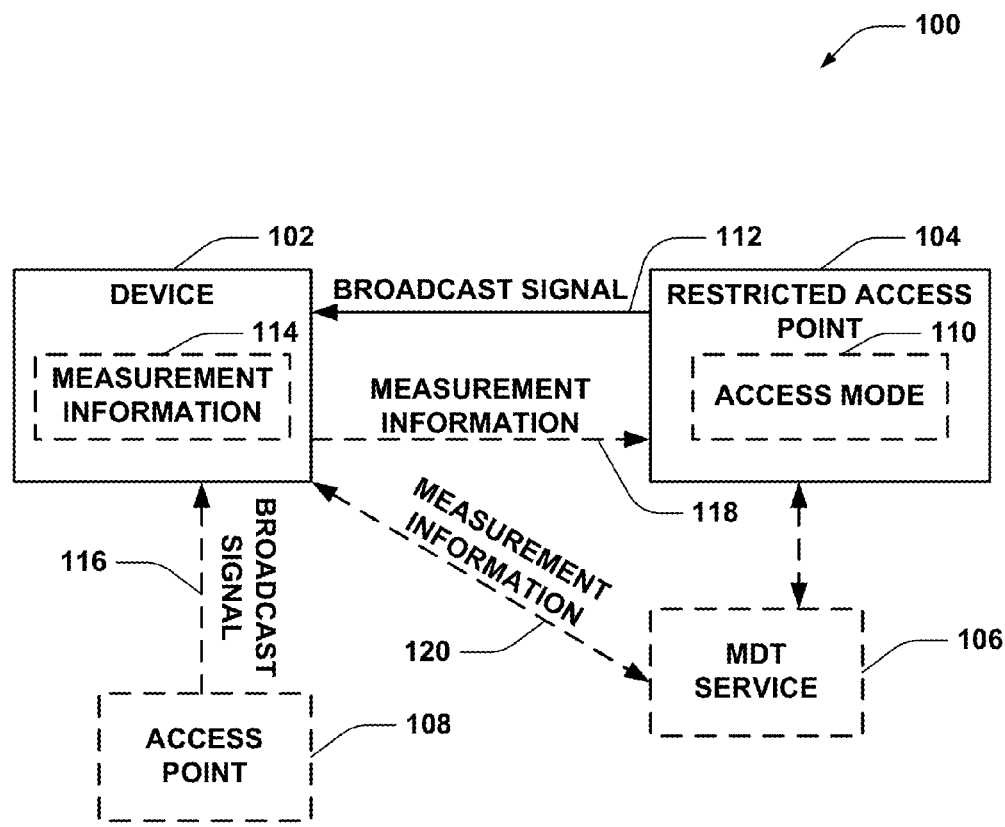
FIG. 1 is a block diagram of an example system that facilitates providing access point measurements to a restricted access point.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, device measurements of parameters related to a restricted access point can be reported to the restricted access point (e.g., or one or more other access points). For example, this can be for the purpose of determining restricted access point transmission power and/or reducing interference (e.g., performing enhanced interference management (EIM), etc.) or other processes that utilize such measurements. For example, devices can perform measurements related to the restricted access points (e.g., measurements of radio conditions at or near the restricted access points, signal strength or interference level of the restricted access points, etc.). In one example, the devices can report the measurements to a minimization of drive tests (MDT) server/service. The MDT server/service can make the measurements available to the restricted access points. In another example, the restricted access points can lessen or remove access restrictions for a period of time. In this regard, devices that would otherwise be restricted from connecting to the restricted access point can connect to the restricted access points to provide the measurements during the period of time. In either case, the access points can use the measurements for performing EIM or other procedures based at least in part on the measurements.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an example wireless communication system 100 is illustrated that facilitates reporting device measurements related to restricted access points. System 100 comprises a device 102 that can receive signals from a restricted access point 104. System 100 can optionally comprise a MDT service 106 for receiving measurement information from device 102 regarding signals associated with the restricted access point 104. In addition, an access point 108 can optionally be present in system 100, for which device 102 can measure one or more broadcast signals. For example, device 102 can be a UE, modem (or other tethered device), a portion thereof, and/or the like. Restricted access point 104 can be a femtocell (such as a Home Node B or Home evolved Node B, collectively referred to herein as H(e)NB), picocell, macrocell, or similar base station, a mobile base station, a relay node, a device (e.g., communicating in peer-to-peer or ad-hoc mode), a portion thereof, and/or the like, that restricts access to a subset of devices. MDT service 106 can be substantially any database, server, or other component or collection of components that can store measurement information reported by one or more devices. In an example, MDT service 106 can comprise multiple inter-connected components (e.g., a log collection entity, communicating with a log management entity, etc., which are not shown for ease of explanation).

According to an example, restricted access point 104 can be associated with a wireless cell set. In general, a wireless cell set comprises a set of one or more cells (e.g., provided by at least one access point, such as restricted access point 104) having a defined relationship. An example of a wireless cell set is a closed subscriber group (CSG). The descriptions below may simply refer to the term CSG, rather than the more general term wireless cell set. It should be appreciated, however, that the described concepts may be applicable to other types of defined sets or groups (e.g., restricted groups) of wireless cells or other similar entities. In this regard, restricted access point 104 can operate according to an access mode 110 to provide CSG access to not provide such access. For example, restricted access point 104 can set an access mode 110 to an open access mode to provide access to substantially any device able to communicate with restricted access point 104, a closed access mode to allow access to devices that are members of the CSG. Also, restricted groups can provide a diminished level access mode 110 to non-members (which can be referred to herein as a hybrid access mode, or the cells within the group as hybrid cells). In addition, it is to be appreciated that an access point, such as restricted access point 104, can provide one or more cells within which devices can communicate with the access point.

Device 102 can receive signals broadcasted from restricted access point 104, such as broadcast signal 112 for example, but may not be able to access restricted access point 104 (e.g., due to not being a member of a CSG or other restricted group of restricted access point 104). Restricted access point 104, however, may be performing EIM or other processes that utilize information from surrounding devices. For example, EIM can relate to reducing of otherwise determining a level of interference of a network node caused to one or more other network nodes based at least in part on measurements of signals received from the network node at various devices. For example, the signal measurements can relate to received signal power at the devices, strength of a signal from the network node, interference level of signals received from the network node a location of the devices, identifiers of the network node or devices, etc. Thus, for example, restricted access point 104 can receive such measurements of signals transmitted by restricted access point 104 from device 102. Based at least in part on this information, using EIM, restricted access point 104 can set a transmission power to optimize a level of interference and a corresponding signal quality of a restricted access point transmission within a cell provided by restricted access point 104.

In any case, device 102 can measure signals, such as broadcast signal 112, from restricted access point 104 and can generate measurement information 114, which as described can include a received signal power, strength of a signal from restricted access point 104, interference level of signals received from restricted access point 104, a location of device 102, an identifier of device 102, etc. In addition, in one example, device 102 can measure other signals from other access points, such as broadcast signal 116 from access point 108. In one example, restricted access point 104 can initialize one or more training periods during which restricted access point 104 can enforce a less restrictive access mode 110 to allow device 102 to communicate therewith for reporting measurement information related to broadcast signal 112 and/or 116.

For example, as described further herein, restricted access point 104 can operate in an open or hybrid access mode 110 during the training period. In this regard, device 102 can connect to restricted access point 104 at least to provide the measurement information 118 during the training period. In another example, device 102 can provide the measurement information 120 to MDT service 106 according to a MDT specification, possibly at a later time than measurement time. As described further herein, device 102 can utilize an interface to MDT service 106 (e.g., through one or more access points and/or other network nodes) to report the measurement information 120, and can include a cell identifier in the measurement information to facilitate differentiating measurement information of multiple access points or related cells. MDT service 106 can then provide access to the measurement information, or at least a representation thereof so restricted access point 104 can perform EIM, etc., using the measurement information or the representation. For example, such a representation can include not only individual measurement(s), but also a significant statistic or action representative of the measurement(s), such as an average, statistical regression, etc.

Figure 2:
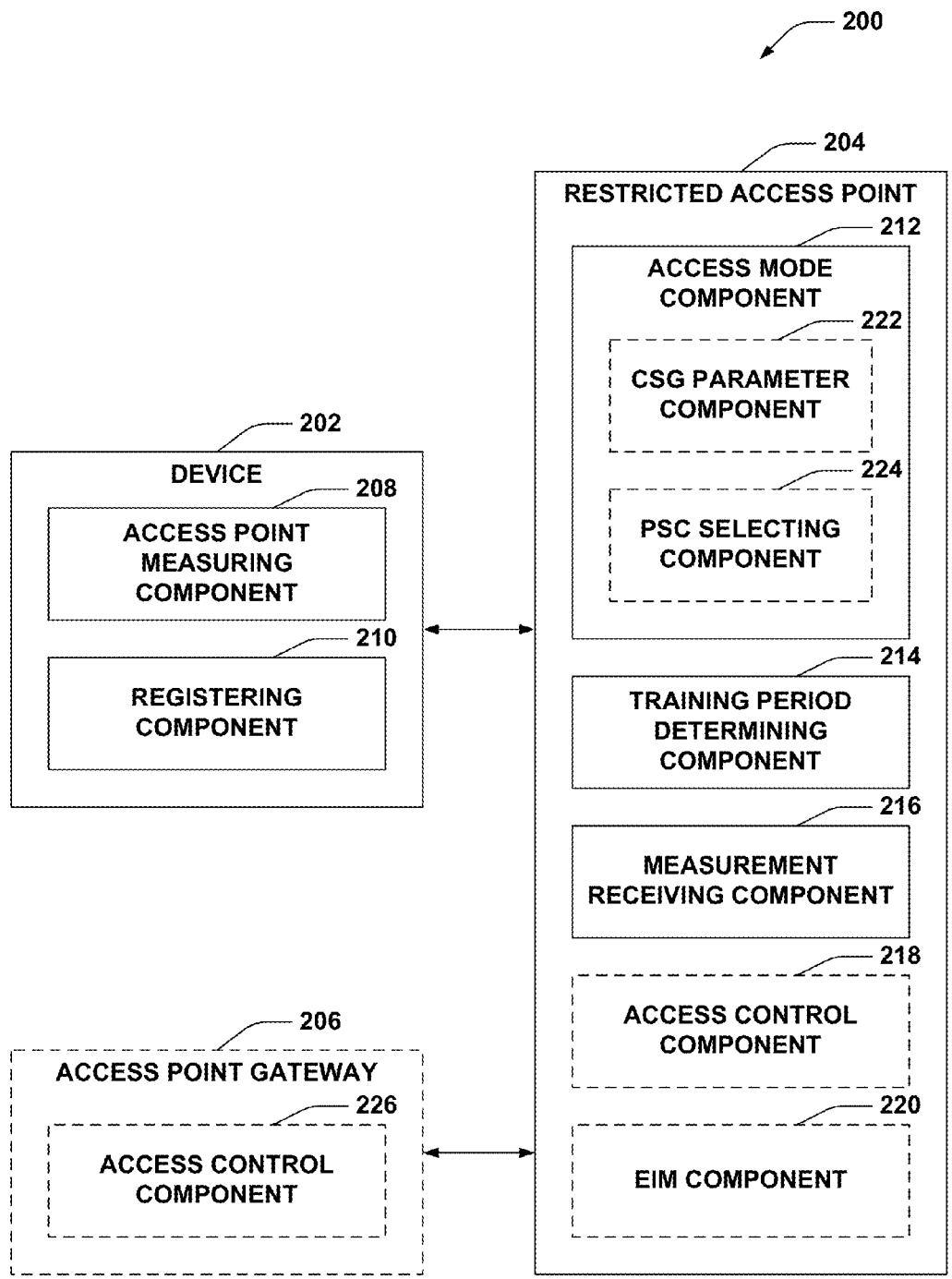
FIG. 2 is a block diagram of an example system for allowing device registration to report access point measurements for performing enhanced interference management (EIM).

Turning to FIG. 2, an example wireless communication system 200 is illustrated that facilitates reporting restricted access point measurement information. System 200 comprises a device 202 operable to receive signals broadcasted from a restricted access point 204. As described, for example, restricted access point 204 can provide CSG functionality such to restrict access of devices that are not members of the CSG. Moreover, system 200 can optionally include an access point gateway 206 that can communicate with one or more restricted access points, such as restricted access point 204, for providing access to one or more components of a core network (not shown). In this regard, for example, restricted access point 204 can be a H(e)NB, femtocell, picocell, macrocell, or similar base station, mobile base station, relay node, etc., access point gateway 206 can be an H(e)NB gateway, and/or device 202 can be a UE, modem (or other tethered device), etc., as described.

Device 202 can comprise an access point measuring component 208 for measuring signals received from one or more access points, and a registering component 210 for performing registration with one or more access points. Restricted access point 204 can comprise an access mode component 212 for operating according to one or more access modes to restrict access to the restricted access point 204 (e.g., open, closed, hybrid, etc. access modes), and a training period determining component 214 for determining a time for opening access to restricted access point 204 to receive measurement information from one or more devices. Restricted access point 204 also comprises a measurement receiving component 216 for obtaining signal measurement information from one or more devices, an optional access control component 218 for restricting device access to a core network, and an optional EIM component 220 for performing EIM based at least in part on received signal measurement information. In addition, access mode component 212 can optionally comprise a CSG parameter component 222 for determining whether to broadcast one or more parameters related to a CSG, and/or a primary synchronization code (PSC) selecting component 224 for determining a PSC to utilize for scrambling one or more broadcast signals (e.g., where different PSCs are used outside and during the time determined by training period determining component 214). Optional access point gateway 206 can comprise an access control component 226 for restricting device access to the core network in additional or alternatively to access control component 218.

According to an example, as described, access point measuring component 208 can receive signals from restricted access point 204 and/or other access points and can perform measurements related to a strength of the signals, a strength of the signal from restricted access point 204, interference of the signal from restricted access point 204, and/or the like. In a specific example, access point measuring component 208 can measure a common pilot indicator channel (CPICH) Ec/Io, CPICH received signal code power (RSCP), cell identity, and/or the like. Access point measuring component 208 can additionally generate measurement information from the measurements, which can include the measurements, one or more identifiers, and/or the like. While access point measuring component 208 can typically report such measurement information to one or more access points, device 202 can be excluded from a CSG of restricted access point 204, for example, preventing access point measuring component 208 from reporting the measurement information. To facilitate receiving the measurement information, however, restricted access point 204 can provide access to device 202 for at least a period of time, during which access point measuring component 208 can communicate the measurement information to restricted access point 204.

Thus, for example, access mode component 212 can cause restricted access point 204 to operate in a closed access mode such that devices that are not members of the CSG cannot access restricted access point 204. In this example, access mode component 212 can provide wireless network access to devices that are members of the CSG, while denying requests from non-member devices to communicate with restricted access point 204. In addition, CSG parameter component 222 can advertise a CSG identifier of the CSG related to restricted access point 204, along with a CSG indicator that specifies to device 202 the operating mode as closed access. For example, a combination of CSG identifier and CSG indicator can be used to specify the operating mode. In one example, CSG parameter component 222 can broadcast a CSG identifier and a CSG indicator to specify to device 202 a closed access mode (e.g., access to only members of a CSG), a CSG identifier with no CSG indicator to specify a hybrid access mode (e.g., restricted access to non-members), and neither a CSG identifier nor a CSG indicator to specify an open access mode (e.g., access to substantially all devices).

To facilitate receiving measurement information from device 202, however, training period determining component 214 can determine a period of time during which to switch to a hybrid or open access mode, for example. Training period determining component 214 can determine the period of time based at least in part on detecting a threshold change in radio conditions, such as at least one of: a RSSI (received signal strength indication), which can be determined based on measuring signals from neighboring access points, for example, receiving measurement reports from member devices, and/or the like; one or more traffic conditions (e.g., detecting a decrease in a number of devices connected to restricted access point 204 such that opening access may have a smaller effect on the connected devices); etc.

In another example, training period determining component 214 can determine the period of time based at least in part on receiving one or more configured values (e.g., from a hardcoding, configuration, network specification, etc.), such as time values (e.g., a starting time, an end time, a timer interval or duration, and/or the like), which can include information or inferences regarding the configured values (e.g., more training periods around lunch time for a restricted access point in an office, etc.). In another example, the configured values can relate to a deployment, environment, or substantially any values from which a training period can be defined. In an example, training period determining component 214 can receive the values from a HNB management system (HMS) (not shown) or other management system, a user interface for the restricted access point 204 that allows a user to specify a time interval, start training, etc., one or more other access points, one or more devices, such as device 202, and/or the like.

In any case, during the determined period of time, access mode component 212 can lessen restrictions for communicating with restricted access point 204. In one example, access mode component 212 can cause restricted access point 204 to operate in a hybrid mode during the period of time, such to allow at least some level of access to devices that are not members of the CSG while allowing increased access to member devices. In this regard, during the period of time, CSG parameter component 222 can refrain from transmitting the CSG indicator that specifies the closed access mode (e.g., and/or transmit a CSG indicator that specifies hybrid mode). In this regard, for example, registering component 210 can detect that restricted access point 204 is operating in hybrid access mode (e.g., based at least in part on receiving the CSG identifier without a CSG indicator, and/or a CSG indicator that specifies a hybrid access mode). In addition, restricted access point 204 can be a primary interferer with device 202 communications. Thus, registering component 210 can register with restricted access point 204 operating in hybrid access mode. For example, this can include performing a registration with restricted access point 204 while device 202 is in active mode, performing an idle mode reselection to restricted access point 204, and/or the like.

Once registering component 210 registers with the restricted access point 204 in hybrid access mode, access point measuring component 208 can provide signal measurement information to restricted access point 204. Measurement receiving component 216 can obtain the measurement information. In this regard, in one example, EIM component 220 can optionally perform EIM based at least in part on the measurement information. In one example, while device 202 is connected to restricted access point 204, access control component 218 can restrict device 202 access to a core network. In this regard, restricted access point 204 can initialize the hybrid access mode for device 202 for the purpose of receiving the measurement information for EIM (e.g., or other process, as described). Thus, access control component 218 can block at least some communications from device 202 intended to access the core network (e.g., user plane packets, etc.). In another example, access point gateway 206, and/or one or more components of the core network can provide access control, as described further herein.

In one example, since CSG parameter component 222 still advertises the CSG identifier during the training period, registering component 210 receives the CSG identifier and specifies the CSG identifier in a measurement report (e.g., for active hand-in signaling towards restricted access point 204, as shown below in FIG. 3). Thus, access control component 218 can determine whether device 202 is a member of the CSG based at least in part on the specified CSG identifier and CSG membership information received for device 202. In another example, though access mode component 212 is hybrid to device, access mode component 212 can indicate a closed access mode to the core network. In this regard, the core network can perform access control based on receiving the CSG identifier and reported device 202 information as for a closed mode access point. For example, the core network can reject device 202 access based on the CSG identifier, and access control component 218 can accordingly block communications from device 202 intended for the core network. In another example, access control component 218 can decode non-access stratum (NAS), access stratum (AS), Iu interface, radio access network application part (RANAP), or similar messages received from the core network to determine whether device 202 is a member of the CSG.

For example, restricted access point 204 can receive messages such as RANAP COMMON ID, HNBAP UE REGISTRATION ACCEPT, HNBAP UE REGISTRATION REJECT, and/or similar messages from the core network for device 202. In one example, such messages can include a CSG rejection code. Access control component 218 can decode such messages to determine whether device 202 is a member of the CSG (e.g., if registration is accepted or rejected based at least in part on the HNBAP messages, whether a common ID is present in the RANAP COMMON ID message, etc.). Moreover, in an example where access point gateway 206 facilitates communications between restricted access point 204 and the core network, access control component 226 can determine whether device 202 is a member of the CSG based at least in part on decoding the NAS, AS, Iu, RANAP, etc. messages from the core network to restricted access point 204 regarding device 202. Access control component 226 can control access of device 202 to the core network and/or provide access control information to restricted access point 204 based at least in part on the decoded messages.

In any case, if access control component 218, access control component 226, or the core network determine the device 202 is not a member of the CSG, communications from the device 202, other than measurement reports to restricted access point 204 (e.g., communications intended for the core network), can be rejected. Similarly, in the case of reselection, once the device is registered with restricted access point 204, access control component 218 can specify the CSG identifier in a connect message for the device 202, and core network can indicate whether device 202 is a member of the CSG. Access control component 218, in this example, can similarly control access to core network based at least in part on the indication of CSG identifier and/or an indication of the access mode of device 202.

When the period of time is complete, as determined by training period determining component 214, CSG parameter component 222 can again advertise the CSG indicator specifying closed access mode at restricted access point 204. If device 202 is still connected to restricted access point 204 at this time, for example, access mode component 212 can additionally close the connection with device 202, instruct device 202 to reselect or handover to another access point (e.g., based on received measurement reports), and/or the like.

Moreover, for example, access points can use scrambling code, such as a PSC, for scrambling a pilot signal (e.g., transmitted over a CPICH) to provide at least quasi-orthogonality among the pilot signals of neighboring access points. In addition, a portion of available PSCs can be reserved for restricted (e.g., CSG) access points to allow identification of the access point as CSG without processing broadcast signals to determine a CSG identifier, etc. Moreover, a group of PSCs can be reserved for active hand-in, while another group can possibly be reserved for registration (e.g., from idle-mode). In an example, the group reserved for registration can be a null set. For example, this can be based at least in part on a specification and hardcoded or otherwise configured to device 202, restricted access point 204, etc. In this regard, during the period of time determined for training, PSC selecting component 224 can also select a PSC for scrambling that is not reserved for restricted access points indicating that the access mode is not closed (e.g., to device 202 and/or a device receiving measurement reports from device 202). Furthermore, in an example, PSC selecting component 224 can select the PSC from the group reserved for active hand-in.

Thus, in one example, PSC selecting component 224 can switch between a PSC reserved for a CSG access point and a PSC not so reserved. In one example, PSC selecting component 224 can perform the switching when no devices are communicating with restricted access point 204, so as not to impact devices communicating with restricted access point 204. Thus, in this example, training period determining component 214 can determine to begin and/or end a training period when the restricted access point 204 is not communicating with any devices. In another example, PSC selecting component 224 can switch between PSCs regardless of devices communicating with restricted access point 204. Where device 202 is in a measurement reporting state, for example, PSC selecting component 224 can configure device 202 with a new PSC before switching to allow device 202 to continue measuring. Where device 202 is not in a measurement reporting state, for example, the device 202 can perform reselection based on the PSC switch, and can likely reconnect to restricted access point 204. It is to be appreciated that PSC selecting component 224 can configure device 202 with a new PSC in other cases as well, such as where device 202 is in active mode communications with restricted access point 204 (e.g., in a call), such that switching the PSC can cause minimal interruption to device 202.

In another example, PSC selecting component 224 can maintain the same PSC regardless of training period and/or can switch to a PSC that is still reserved for CSG access points during the training period. This, however, can prevent registering component 210 from attempting registration with restricted access point 204 for some devices 202 (e.g., legacy devices that are unable to process CSG information). For example, registering component 210 can utilize a neighbor cell list (e.g., a whitelist of accessible neighboring cell or related access point PSCs); if the PSC is for CSG access points but is in the neighbor cell list (NCL), registering component 210 for the remaining devices 202 (those able to process CSG information) can attempt to register with restricted access point 204.

Additionally, it is to be appreciated that switching between a PSC reserved for CSG access points and a PSC not so reserved, for example, can impact manual CSG selection functionality at one or more devices, since a fingerprint of the restricted access point 204 is modified. For example, where device 202 is a member of the CSG and registers with restricted access point 204 during the training period, it may not recognize the PSC used by restricted access point 204 following the training period (and/or vice versa) if not in the NCL. Thus, in this example, device 202 may need to re-register with restricted access point 204 following the training period when PSC selecting component 224 scrambles CPICH using the original PSC. In this regard as well, PSC selecting component 224 can utilize the same PSC or switch to another PSC reserved for CSG access points during the training period that is in the NCL for devices that are members of the CSG to prevent such re-registration.

Moreover, PSC selecting component 224 can determine a PSC to utilize based at least in part on an allocation of PSCs at various neighboring cells or access points. For example, PSC selecting component 224 can determine the allocation from one or more neighbor lists received in measurement control messages (e.g., received from device 202 and/or other devices), from processing broadcast signals of neighboring cells (e.g., similar to a device), detecting surrounding pilot signals (e.g., similar to a device), and/or the like. In one example, processing broadcast signals and/or detecting surrounding pilot signals can be performed using a co-located UE (not shown). In one example, the broadcast signals and/or pilot signals can be received from the access points and/or from a device that receives the signals. In another example, PSC selecting component can receive the PSC from signaling by a controlling entity (e.g., HMS), a hard-coding, configuration, network specification, and/or the like.

In another example, rather than switching to a hybrid access mode for the training period, access mode component 212 can switch to an open access mode. In this regard, CSG parameter component 222 can refrain not only from transmitting the CSG indicator, but also a CSG identifier during the training period to advertise open access. Thus, registering component 210 can register with restricted access point 204 when open access is advertised, and access point measuring component 208 can provide measurement information thereto, as described. In addition, in an example, access control component 218 can perform similar access control, PSC selecting component 224 can similarly select a different PSC reserved for restricted access points or not so reserved, and/or the like, as described above. Following the training period, CSG parameter component 222 can continue broadcasting the CSG identifier and CSG indicator (e.g., and/or PSC selecting component can scramble the CPICH with a PSC reserved for restricted access points), etc.

In yet another example, rather than switching access modes, CSG parameter component 222 can advertise a CSG identifier that indicates acceptance of registrations for providing measurement information during the training period. For example, the CSG identifier can be placed in an operator whitelist (e.g., a whitelist of accessible CSG cells or related access points managed by a core network) for one or more devices. Thus, for example, upon CSG parameter component 222 advertising the CSG identifier representing the training period, the registering component 210 can detect the CSG identifier and locate the identifier in the whitelist for device 202. Accordingly, registering component 210 can register with restricted access point 204 and can provide measurement information thereto, as described. Following the training period, the CSG parameter component 222 can continue broadcasting the original CSG identifier.

In this example, a device 202 that is a member of the CSG may need to re-register if registered during the training period (e.g., since the CSG identifier used for closed access mode was not broadcasted upon registering). In addition, in this example, the PSC selecting component 224 can continue using the same PSC throughout, which as described can prevent registering component 210 from attempting registration with restricted access point 204 for some devices 202 (e.g., legacy devices that are unable to process CSG information). In addition, in one example, training period determining component 214 can determine to begin a training period based at least in part on availability of the CSG identifier that indicates the training period. For example, this CSG identifier can be managed by a centralized entity to ensure that restricted access points within proximity of one another do not use the CSG identifier during the same time period.

Figure 3:
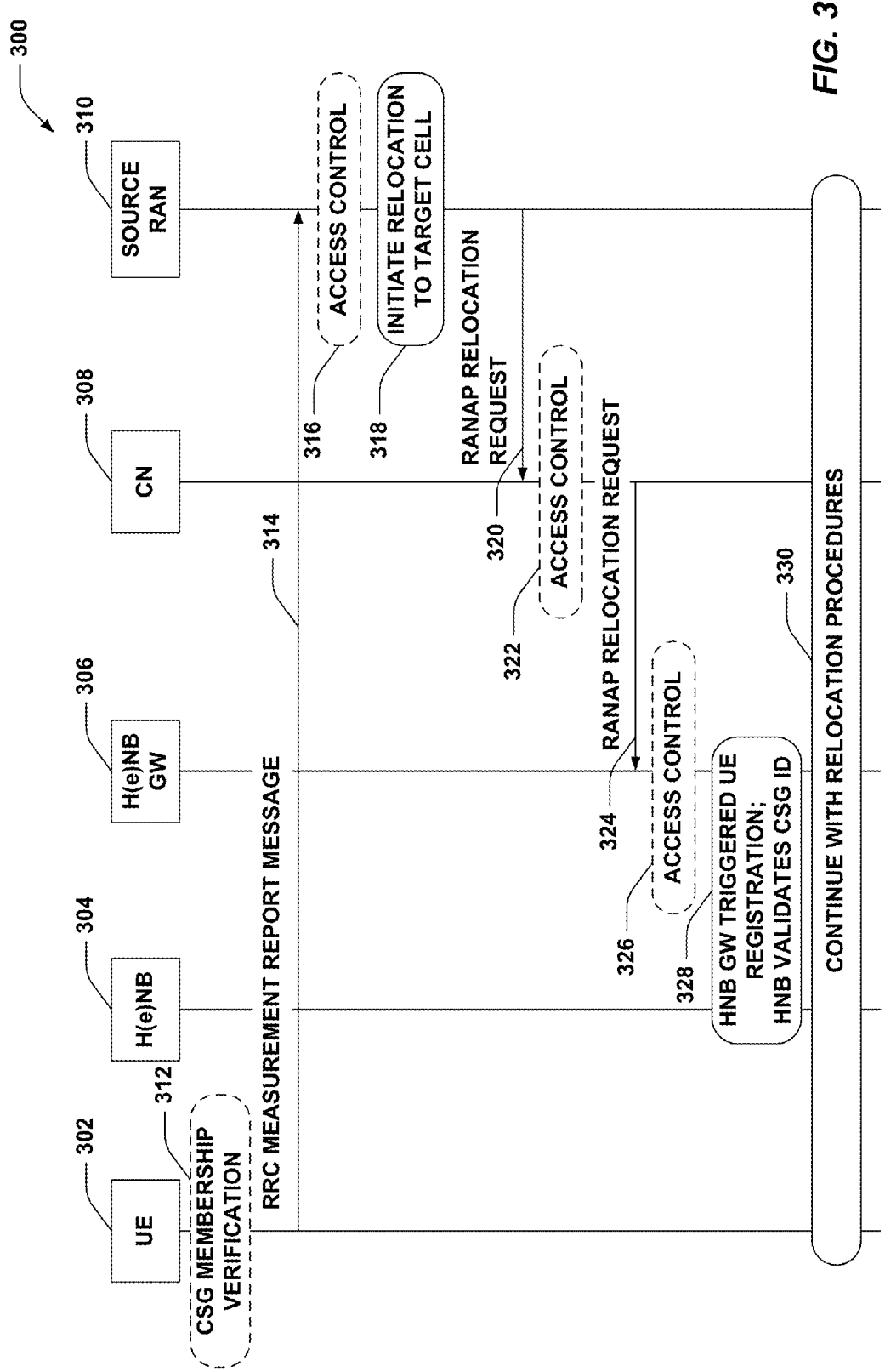

Referring to FIG. 3, an example wireless communication system 300 is illustrated for providing core network access control of devices handing-in to an access point during a training period. System 300 comprises a UE 302 that can receive signals from a H(e)NB 304. H(e)NB 304 can communicate with an H(e)NB gateway (GW) 306, which can provide access to core network (CN) 308. In addition, system 300 includes a source radio access network 310 with which UE 302 communicates to receive access to core network 308. As described previously, H(e)NB 304 can restrict access to UEs that are members of a CSG, and in this example, UE 302 is not a member. In this example, H(e)NB 304 can lessen restrictions (e.g., operate in a hybrid or open access mode) to allow UE 302 to connect and report measurement information of H(e)NB 304, as described. Thus, UE 302 can measure surrounding cells, and can obtain a signal from H(e)NB 304. At 312, UE 302 can optionally perform CSG membership verification based at least in part on the received signal (e.g., verifying a CSG identifier in the signal with a whitelist, etc.). UE 302 can transmit an RRC measurement report message 312 to source RAN 310 including the H(e)NB 304.

For example, H(e)NB 304 can be interfering with UE 302 communications; thus, UE 302 can include H(e)NB 304 in the measurement report for active hand-in. Where UE 302 performed membership verification 312, UE 302 can additionally include an indication of whether UE 302 is a member of the CSG of H(e)NB 304 in the measurement report message 314. Source RAN 310 can optionally perform access control 316 for UE 302 to determine whether UE 302 can access H(e)NB 304, and/or a level of access to be provided, as described. Source RAN 310 can accordingly initiate relocation to the target cell 318 for UE 302, where the target cell is provided by H(e)NB 304, and/or can prevent handover of UE 302 where source RAN 310 determines UE 302 is unable to access H(e)NB 304. For example, source RAN 310 can determine whether H(e)NB 304 is closed based at least in part on a PSC received in the measurement report message 314.

In addition, source RAN 310 can communicate a RANAP relocation request 320 to CN 308. CN 308 can perform access control 318 to determine whether UE 302 is permitted to access CN 308 through H(e)NB 304. In this regard, UE 302 can include a CSG identifier of H(e)NB 304 in the RRC measurement report message 314 to source RAN 310, and source RAN 310 can forward the CSG identifier in the RANAP relocation request 320 as well, along with an indicator of the assumed access mode of H(e)NB 304. Thus, at 322, CN 308 can optionally perform access control to determine whether UE 302 is a member of the CSG based at least in part on the CSG identifier (e.g., and CSG subscription information stored for UE 302).

In this example, CN 308 can transmit the RANAP relocation request 324 to H(e)NB gateway to facilitate relocating UE 302 to H(e)NB 304. CN 308 can indicate whether UE 302 is a member of the CSG in the RANAP relocation request 324, as well as the CSG identifier, in one example. In addition, in an example, H(e)NB GW 306 can additionally or alternatively perform access control at 326. At 328, H(e)NB GW 306 can trigger a UE registration with H(e)NB 304, which again can include the CSG identifier. H(e)NB 304 can additionally validate the CSG identifier. At 330, relocation procedures can continue. Thus, using the CSG identifier and/or the indication of whether UE 302 is a member of the CSG, H(e)NB 304, H(e)NB GW 306, and/or CN 308 can control access of UE 302 to the CN 308. Thus, UE 302 can connect to H(e)NB 304 to at least report measurement information, but may or may not be able to communicate with CN 308 if not a member of the CSG. For example, this can depend at least in part on a determination by the source RAN 310 of H(e)NB 304 access mode etc. In another example, CSG and/or membership indication may be absent altogether when H(e)NB 304 is in open access mode (or assumed open by source RAN 310). Moreover, though not shown, if it is determined that the UE 302 is not be allowed access to H(e)NB 304, H(e)NB GW 306 can still notify H(e)NB 304 of the attempted hand-in via access control 326.

Figure 4:
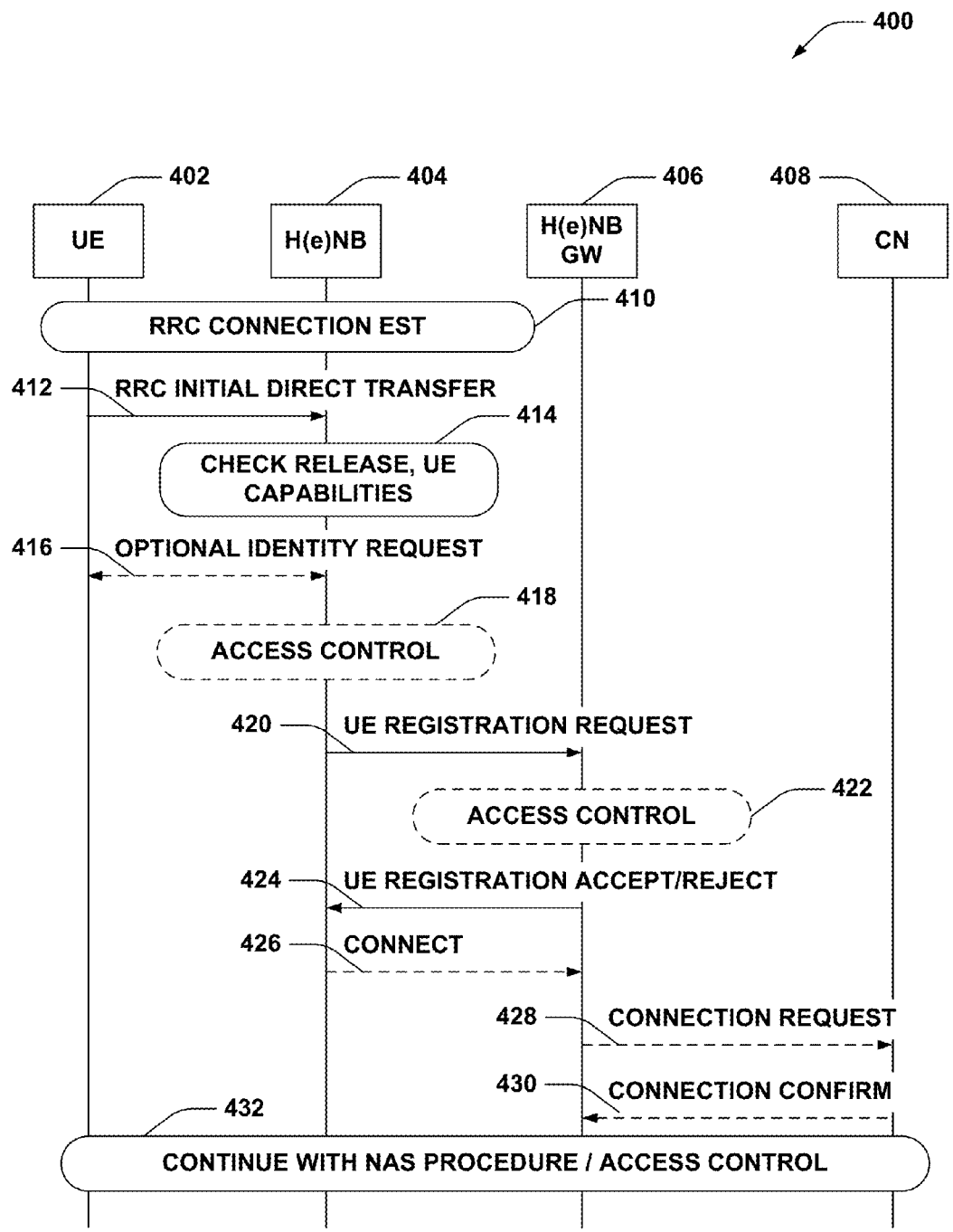
FIG. 4 is an example message flow diagram of an aspect of performing access control for reselection.

Referring to FIG. 4, an example wireless communication system 400 is illustrated for providing access control of devices reselecting to an access point during a training period. System 400 comprises a UE 402 that can receive signals from a H(e)NB 404. H(e)NB 404 can communicate with an H(e)NB GW 406, which can provide access to CN 408. As described previously, H(e)NB 404 can restrict access to UEs that are members of a CSG, and in this example, UE 402 is not a member. In this example, H(e)NB 404 can lessen restrictions (e.g., to operate in a hybrid or open access mode) to allow UE 402 to connect and report measurement information of H(e)NB 404, as described. Thus, UE can perform an RRC connection establishment 410 to the H(e)NB 404.

Following establishment of the connection, UE 402 can communicate an RRC initial direct transfer 412 to the H(e)NB 404. H(e)NB 404 can check release and UE capabilities at 414. If UE 402's identity provided in 410 is not recognizable by H(e)NB, UE 402 can also optionally be requested to transmit an identity to H(e)NB 404 via a request-response procedure 416. In addition, H(e)NB 404 can optionally perform an access control 418 to determine whether UE 402 is a member of a CSG related to H(e)NB 404. H(e)NB 404, in either case, can transmit a UE registration request 420 to H(e)NB GW 406 to determine whether UE 402 is authorized to access H(e)NB 404. H(e)NB GW 406 can optionally perform access control 422 to determine whether UE 402 can access H(e)NB 404, and can transmit a UE registration accept and/or reject 424 to H(e)NB 404. For example, the UE registration message 420 can include a CSG identifier of H(e)NB 404 and/or an identity of UE 402, as well as an indication of whether the UE 402 supports the CSG. In another example, H(e)NB 404 can assume H(e)NB GW 406 performs access control 422 based at least in part on parameters received from CN 408 regarding the UE 402 (e.g., CSG membership information) and a CSG identifier if H(e)NB 404. Thus, as part of access control 422, H(e)NB-GW 406 can reject the UE registration or other communications where H(e)NB GW 406 determines that UE 402 is not a member of the CSG, and can transmit a UE registration deny message (not shown) to H(e)NB 404.

In this example, based at least in part on receiving the UE registration reject 424, H(e)NB 404 can register UE 402 as non-member (e.g., where H(e)NB 404 is in training mode). In another example, H(e)NB 404 can register UE 402 as a member, and depend on H(e)NB GW 406 and/or CS 408 to perform access control based at least in part on H(e)NB 404 indicating a closed or hybrid access mode to H(e)NB GW 406 and/or CN 408, as described. In this case, and/or where UE registration accept 424 is received, H(e)NB 404 can request connection 426 of UE 402. In this example, H(e)NB GW 406 can include the CSG identifier in an optional connection request 428 to CN 408, which can be a CSG identifier other than that utilized by H(e)NB 404 in a training mode, as described. For example, the connection request 428 can be a skinny call control protocol (SCCP) message or similar protocol message. In this regard, CN 408 can determine whether UE 402 is a member of the CSG to enforce access control. CN 408 can communicate a connection confirm to H(e)NB GW 406, which can specify whether UE 402 is a member of the CSG.

In addition, NAS procedure can continue at 432, which can provide another optional form of access control, by informing H(e)NB 404 or H(e)NB-GW 406 (e.g., via a NAS reject) that UE 402 can or cannot access H(e)NB 404. As described, for example, H(e)NB 404 or H(e)NB-GW 406 can decode NAS, AS, Iu, RANAP, or other messages from CN 408 to determine CSG membership of UE 402). In another example, CN 408 can utilize another message, such as RANAP COMMON ID, to inform H(e)NB 404 or H(e)NB-GW 406 whether UE 402 is a member of the CSG related to H(e)NB 404. In one example, the message can include a CSG rejection code if, for example, UE 402 is not a member of the CSG. Thus, using the indication of whether UE 402 is a member of the CSG, H(e)NB 404, H(e)NB GW 406, and/or CN 408 can control access of UE 402 to the CN 408. Thus, UE 402 can connect to H(e)NB 404 to at least report measurement information, but may be prevented from communicating (e.g., sending or receiving data packets) with CN 408 if not a member of the CSG. It is to be appreciated, in an example, that other messages can be communicated and are not shown, such as RANAP COMMON ID, HNBAP UE REGISTRATION REJECT, etc.

Figure 5:
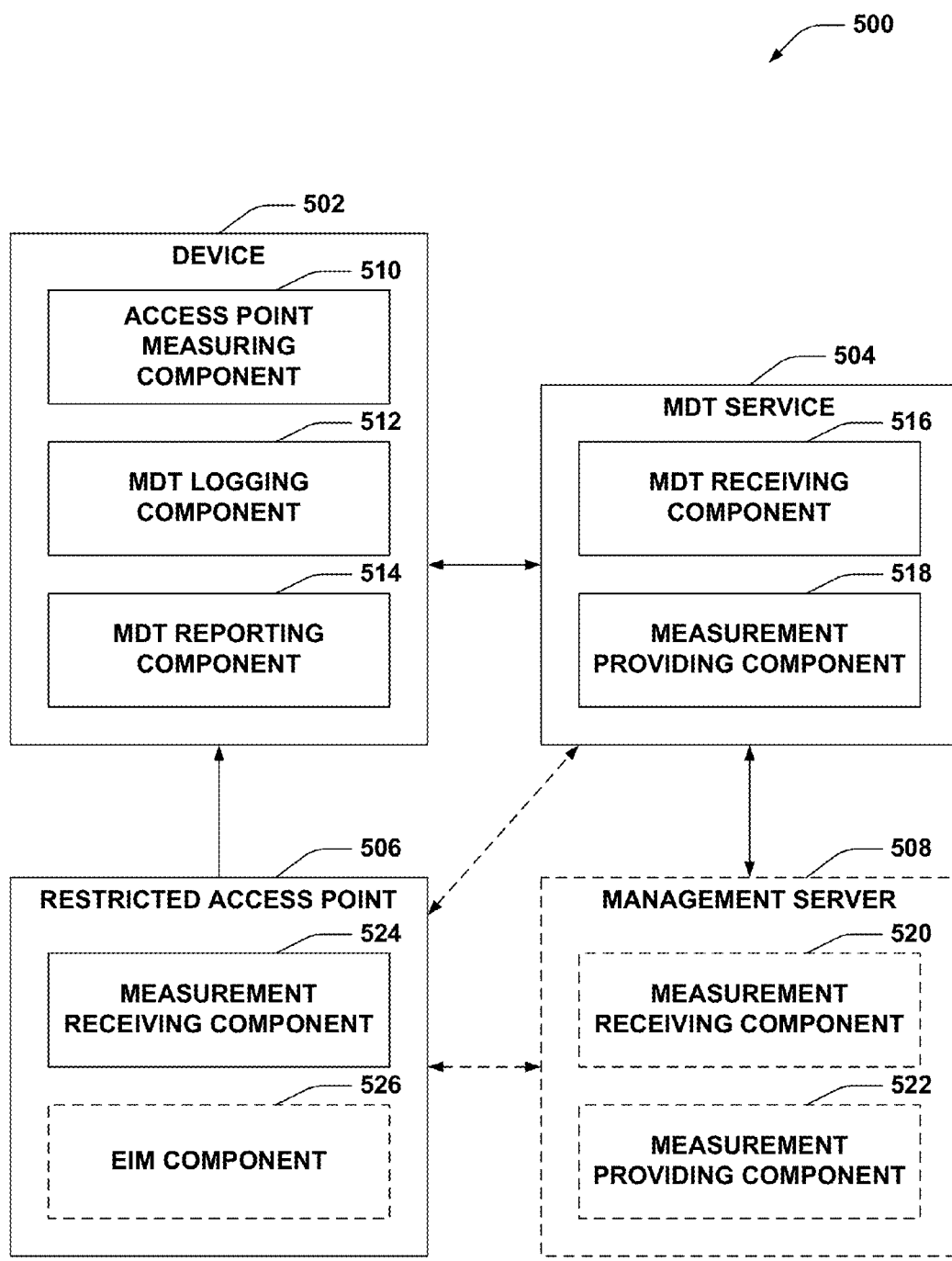
FIG. 5 is a block diagram of an example system for reporting access point measurements to a minimization of drive tests (MDT) service.

Turning to FIG. 5, an example wireless communication system 500 is depicted that facilitates reporting measurement information of restricted access points using MDT. System 500 comprises a device 502 that can communicate with an MDT service 504 to report measured information thereto to mitigate performing drive tests, as described above. For example, MDT is supported in 3GPP to include a UTRAN entity to configure and collected MDT logs from devices using radio resource control (RRC). In addition, MDT is supported in a open mobile alliance (OMA) device management (DM) service including a centralized MDT server that configures and collects MDT logs from devices in a user plane (e.g., using hypertext transport protocol (HTTP), etc.). In this regard, MDT service 504 can be, and/or can be implemented within, the UTRAN entity or entities, an OMA DM server (e.g., where device 502 is an OAM DM client), and/or the like, for example. System 500 can also include a restricted access point 506 from which device 502 can receive one or more signals, and/or an optional management server 508 that can provide information to one or more access points. Device 502 can be a UE, modem, etc., and restricted access point 506 can be a H(e)NB, femtocell or other base station, etc., as described previously. In addition, management server 508 can be a HMS or similar management server.

Device 502 can comprise an access point measuring component 510 for performing measurements of one or more signals received from an access point, an MDT logging component 512 for creating one or more MDT logs according to a configuration, and an MDT reporting component 514 for communicating the one or more logs to an MDT service. MDT service 504 can comprise an MDT receiving component 516 for obtaining one or more MDT logs, and a measurement providing component 518 for reporting access point measurements received in the one or more MDT logs to a wireless network component. Optional management server 508 comprises an optional measurement receiving component 520 for obtaining one or more access point measurements from an MDT service, and an optional measurement providing component 522 for communicating the one or more access point measurements to one or more access points. Restricted access point 506 can comprise a measurement receiving component 524 for obtaining one or more access point measurements, and an optional EIM component 526 for performing EIM based at least in part on the one or more measurements.

According to an example, device 502 can be configured to perform MDT by measuring parameters related to one or more access points, logging the parameters, and reporting the logs to MDT service 504. In one example, details regarding log format and content can be provisioned by MDT service 504. Access point measuring component 510 can thus perform measurements of signals received from one or more access points, such as restricted access point 506. In an example, MDT can be utilized to perform measurements for EIM at one or more restricted access points. Thus, for example, access point measuring component 510 can measure or determine a PSC, cell identifier, CPICH RSCP, CPICH Ec/lo, transmit power, and/or the like of restricted access point 506. MDT logging component 512 can insert the measured or determined parameters in a log, and can associate the parameters with a cell identifier of restricted access point 506 for subsequent identification of the parameters. In addition, for example, MDT logging component 512 can associate other parameters with the measured parameters, such as whether device 502 is a member of the CSG of restricted access point 506.

For example, access point measuring component 510 can begin measuring such parameters, and/or MDT logging component 512 can begin logging such parameters based at least in part on one or more triggers, such as a timer, location of device 502, serving cell channel quality (e.g., where restricted access point 506 is an interfering cell), pageability, detecting restricted access point 506 (e.g., based on one or more received signals), determining that logging storage is close to, at, or exceeding a threshold capacity, and/or the like. Similarly, MDT reporting component 514 can transmit one or more logs of such parameters to MDT service 504 based at least in part on one or more triggers. For example, MDT reporting component 514 can receive a network request for the one or more logs (e.g., from a core network component, MDT service 504, and/or the like), and MDT reporting component 514 can accordingly provide the one or more logs to the MDT service 504.

MDT receiving component 516 can obtain and store the one or more MDT logs from device 502. In an example, measurement providing component 518 can communicate one or more access point measurements from the MDT logs to the restricted access point 506 or management server 508. For example, this can be based at least in part on a request from measurement receiving component 524 or measurement receiving component 520 received at measurement providing component 518. For example, the request can include an identifier of the restricted access point 506, and measurement providing component 518 can determine one or more access point measurements stored by MDT receiving component 516 that correspond to the restricted access point 506 based on the identifier. Measurement providing component 518 can communicate the measurements to management server 508 or restricted access point 506.

For example, where measurement providing component 518 communicates the one or more measurements to management server 508, measurement receiving component 520 can obtain the one or more measurements, and measurement providing component 522 can communicate the one or more measurements to restricted access point 506 (e.g., based at least in part on the identifier). It is to be appreciated that measurement providing component 518 and/or measurement providing component 522 can additionally compute representations using the one or more measurements, which can be provided to restricted access point 506. For example, the one or more representations can include individual measurements, a significant statistics or desired action, an average of one or more measurements, a statistical regression, etc., as described. Measurement receiving component 524 can obtain the one or more measurements. In one example, EIM component 526 can utilize the one or more measurements to perform EIM, as described previously. For example, measurement receiving component 524 can additionally receive measurements from one or more devices that are a member of a CSG of restricted access point 506. EIM component 526 can further use these measurements to perform EIM, in one example.

Referring to FIGS. 6-9, example methodologies relating to providing measurements to restricted access points are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 6:
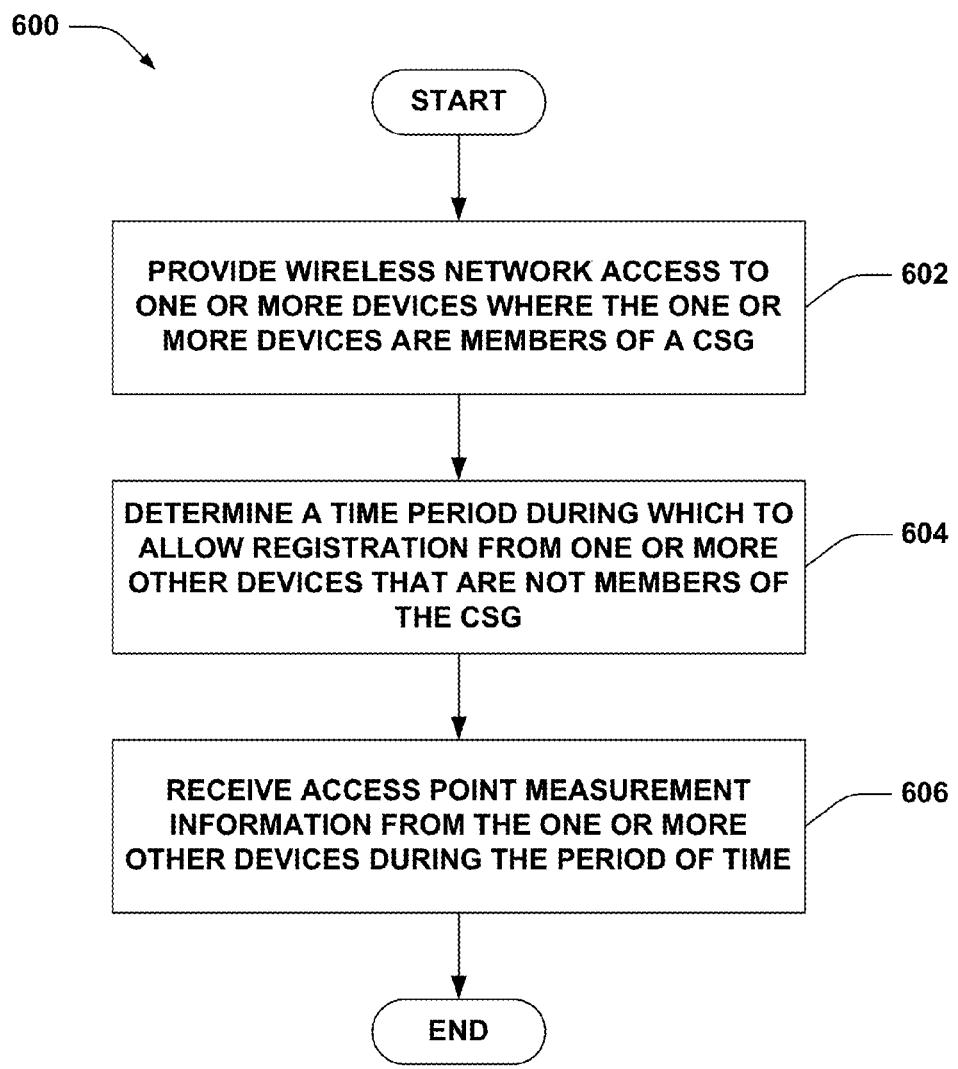
FIG. 6 is a flow chart of an aspect of an example methodology for allowing device registration for communicating access point measurements.

Referring to FIG. 6, an example methodology 600 is displayed that facilitates obtaining access point measurement information from devices that are not members of a CSG. At 602, wireless network access can be provided to one or more devices where the one or more devices are members of a CSG. For example, the wireless network access can be restricted to such devices in a closed access mode. At 604, a time period during which to allow registration from one or more other devices that are not members of the CSG can be determined For example, as described, this can be determined based at least in part on one or more received time value parameters, one or more parameters regarding communicating with devices, and/or the like. In addition, at 606, access point measurement information can be received from the one or more other devices during the period of time. Thus, for example, registrations can be allowed during the period of time to facilitate receiving the access point measurement information at least in part by advertising a hybrid access mode (e.g., by broadcasting the CSG identifier without the CSG indicator), an open access mode (e.g., by refraining from broadcasting the CSG identifier and the CSG indicator), and/or the like, as described.

Figure 7:
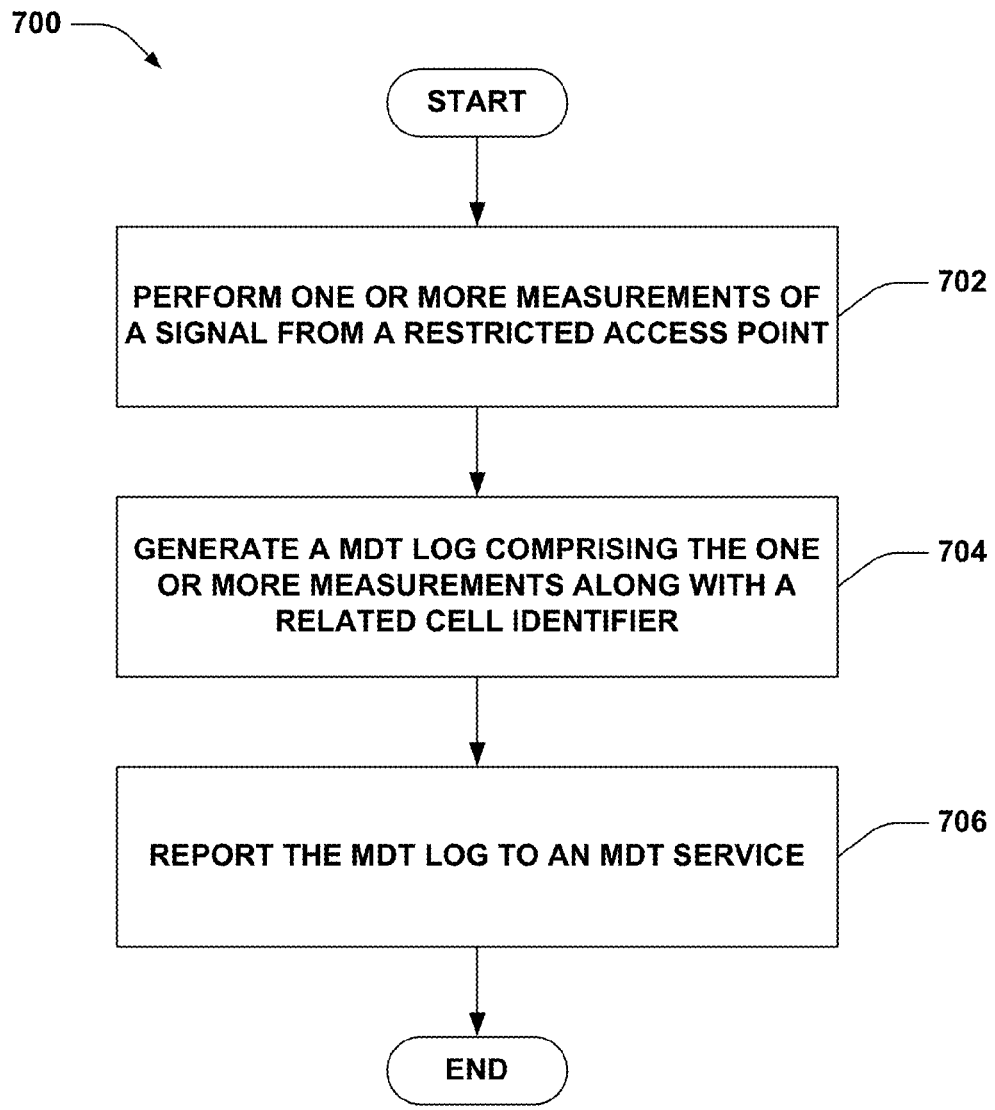
FIG. 7 is a flow chart of an aspect of an example methodology that reports access point measurements in an MDT log.

Turning to FIG. 7, an example methodology 700 is displayed that facilitates reporting access point measurements to a MDT service. At 702, one or more measurements of a signal from a restricted access point can be performed. For example, the measurements can relate to one or more measurements that can be used for performing EIM, as described. At 704, a MDT log can be generated comprising the one or more measurements along with a related cell identifier. As described, the restricted access point may not allow access; thus, the measurements cannot be directly reported thereto. At 706, the MDT log can be reported to an MDT service. For example, by including the cell identifier, the MDT service can differentiate the measurements for reporting to the restricted access point corresponding to the cell identifier.

Figure 8:
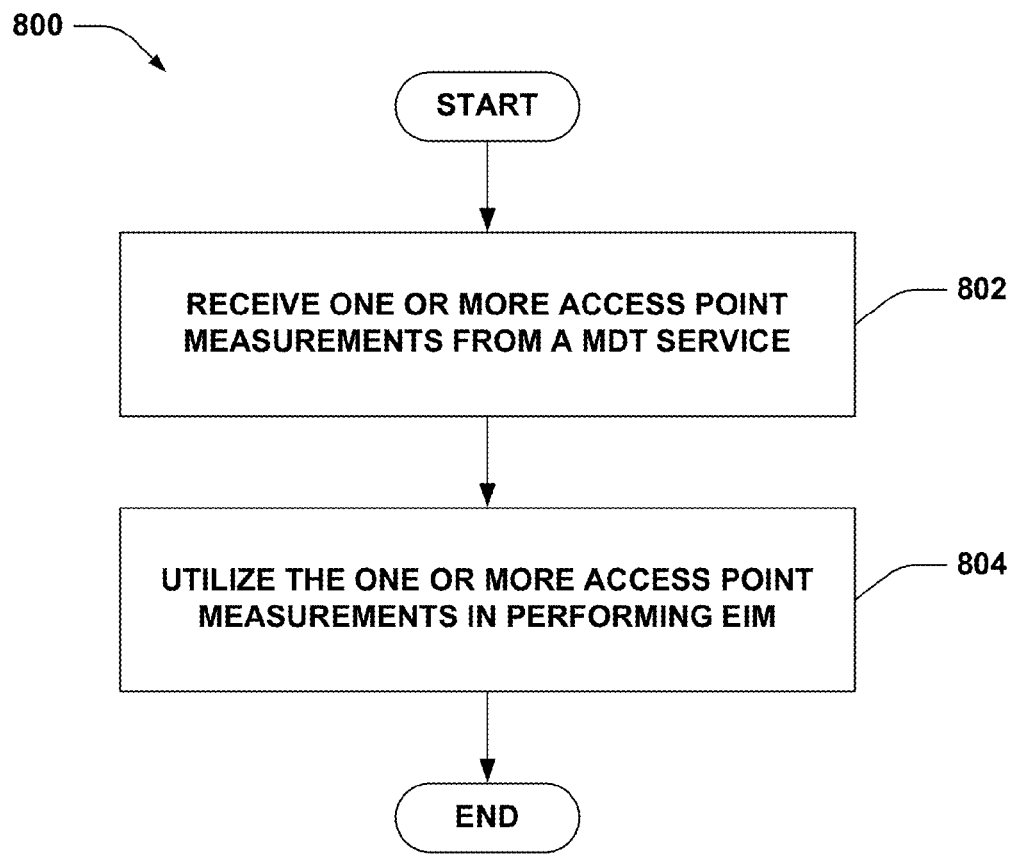
FIG. 8 is a flow chart of an aspect of an example methodology for performing EIM based at least in part on received access point measurements.

Referring to FIG. 8, an example methodology 800 for performing EIM is illustrated. At 802, one or more measurements can be received from a MDT service. For example, the one or more measurements can be reported by a device, as described. In addition, the one or more measurements can be received based at least in part on requesting such from the MDT service (e.g., and/or from a management service that communicates with the MDT service). As described, for example, the one or more measurements can include individual measurements related to an access point, a significant statistic or desired action, an average, a statistical regression, and/or the like. At 804, the one or more access point measurements can be utilized in performing EIM. For example, one or more measurements from a device in the CSG can also be utilized.

Figure 9:
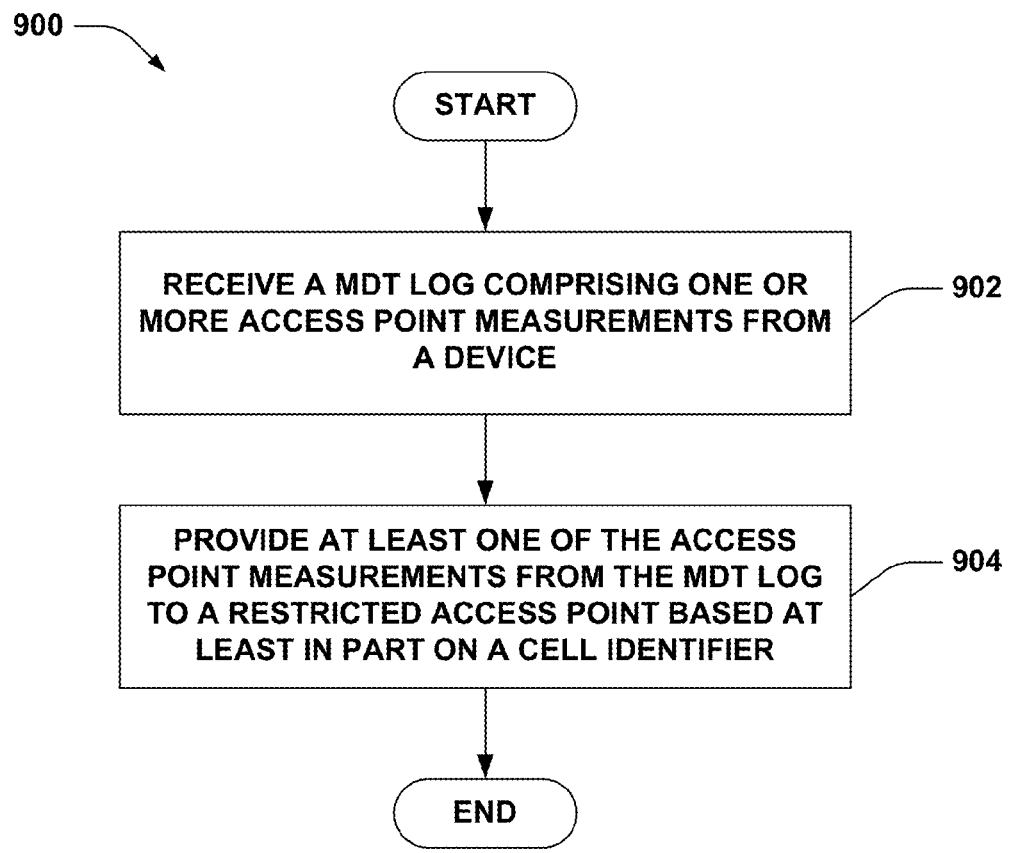
FIG. 9 is a flow chart of an aspect of an example methodology for providing access point measurements received in an MDT log to a restricted access point.

Turning to FIG. 9, an example methodology 900 is depicted for communicating access point measurements received from a device. At 902, a MDT log comprising one or more access point measurements can be received from a device. As described, the MDT log can additionally comprise cell identifiers related to the measurements to facilitate differentiating the measurements for providing to one or more access points. At 904, at least one of the access point measurements from the MDT log can be provided to a restricted access point based at least in part on a cell identifier. In addition, for example, measurements can be processed, as described, so as to provide a desired representation (e.g., a significant statistic, desired action, average of measurements, a statistical regression, etc.) to the restricted access point.

It will be appreciated that, in accordance with one or more aspects described herein, inferences can be made regarding determining a period of time for allowing devices to register at an access point, determining when to log and/or report measurements in MDT, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
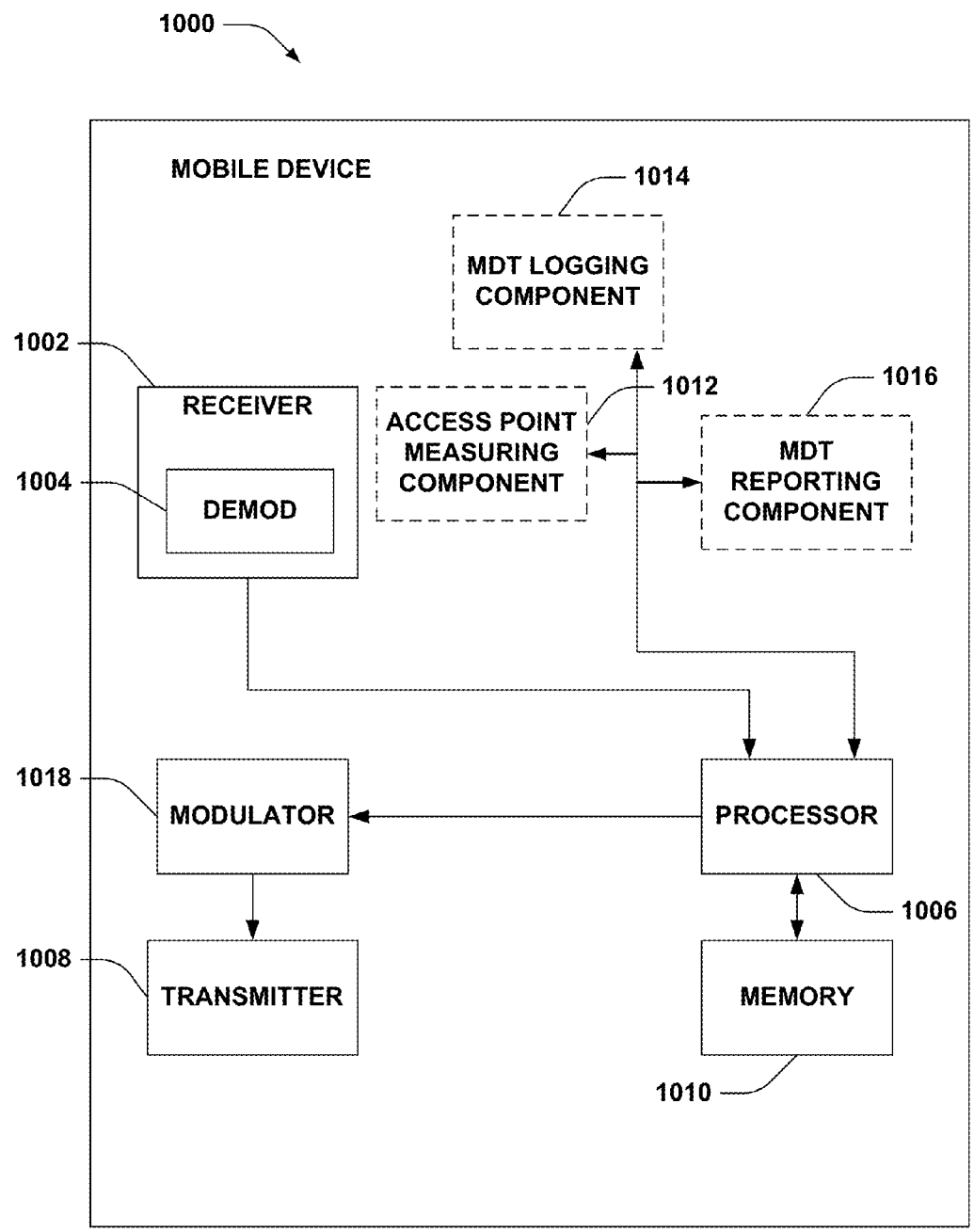
FIG. 10 is a block diagram of an example mobile device for reporting MDT logs.

FIG. 10 is an illustration of a mobile device 1000 that facilitates communicating MDT logs including access point measurements and related cell identifiers. Mobile device 1000 comprises a receiver 1002 that receives a signal from, for instance, a receive antenna (not shown), performs typical actions on (e.g., filters, amplifies, downconverts, etc.) the received signal, and digitizes the conditioned signal to obtain samples. Receiver 1002 can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1008, a processor that controls one or more components of mobile device 1000, and/or a processor that both analyzes information received by receiver 1002, generates information for transmission by transmitter 1008, and controls one or more components of mobile device 1000.

Mobile device 1000 can additionally comprise memory 1010 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1010 can additionally store protocols and/or algorithms associated with estimating and/or utilizing a channel (e.g., performance based, capacity based, etc.).

It will be appreciated that the data store (e.g., memory 1010) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1010 of the subject systems and methods is intended to comprise, without being limited to, these and any other suitable types of memory.

Processor 1006 can further be optionally operatively coupled to an access point measuring component 1012, which can be similar to access point measuring component 510, a MDT logging component 1014, which can be similar to MDT logging component 512, and/or a MDT reporting component 1016, which can be similar to MDT reporting component 514. Mobile device 1000 still further comprises a modulator 1018 that modulates signals for transmission by transmitter 1008 to, for instance, a base station, another mobile device, etc. Although depicted as being separate from the processor 1006, it is to be appreciated that the access point measuring component 1012, MDT logging component 1014, MDT reporting component 1016, demodulator 1004, and/or modulator 1018 can be part of the processor 1006 or multiple processors (not shown), and/or stored as instructions in memory 1010 for execution by processor 1006.

Figure 11:
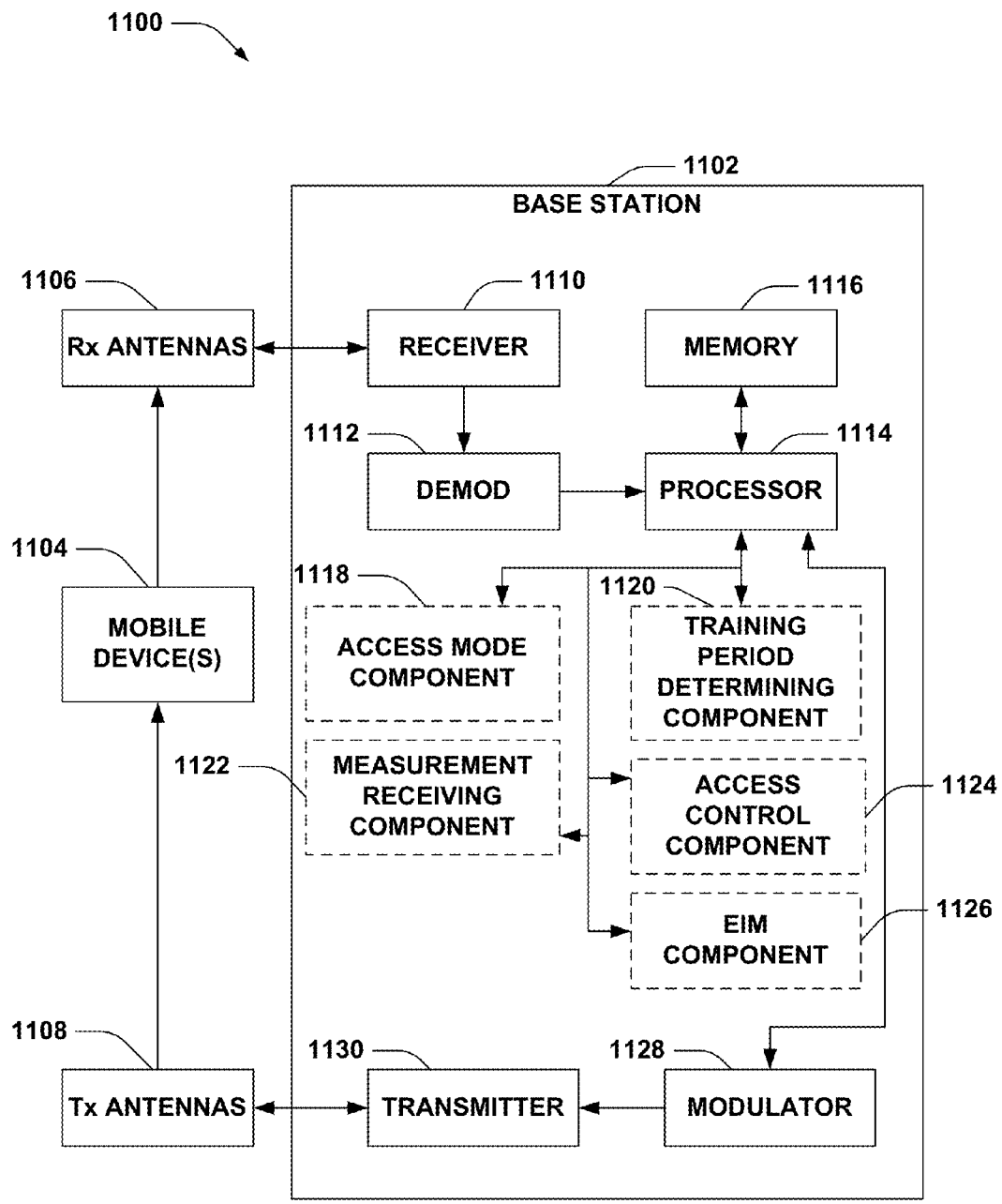
FIG. 11 is a block diagram of an example system for receiving access point measurements.

FIG. 11 is an illustration of a system 1100 that facilitates communicating with one or more devices using wireless communications. System 1100 comprises a base station 1102, which can be substantially any base station (e.g., a small base station, such as a femtocell, picocell, etc., mobile base station . . . ), a relay, etc., having a receiver 1110 that receives signal(s) from one or more mobile devices 1104 through a plurality of receive antennas 1106 (e.g., which can be of multiple network technologies, as described), and a transmitter 1130 that transmits to the one or more mobile devices 1104 through a plurality of transmit antennas 1108 (e.g., which can be of multiple network technologies, as described). In addition, in one example, transmitter 1130 can transmit to the mobile devices 1104 over a wired front link. Receiver 1110 can receive information from one or more receive antennas 1106 and is operatively associated with a demodulator 1112 that demodulates received information. In addition, in an example, receiver 1110 can receive from a wired backhaul link. Demodulated symbols are analyzed by a processor 1114 that can be similar to the processor described above with regard to FIG. 10, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein.

Processor 1114 is further optionally coupled to an access mode component 1118, which can be similar to access mode component 212, a training period determining component 1120, which can be similar to training period determining component 214, and/or a measurement receiving component 1122, which can be similar to measurement receiving component 216 or 324. Processor 1114 can further be optionally coupled to an access control component 1124, which can be similar to access control component 218, and an EIM component 1126, which can be similar to EIM component 220.

Moreover, for example, processor 1114 can modulate signals to be transmitted using modulator 1128, and transmit modulated signals using transmitter 1130. Transmitter 1130 can transmit signals to mobile devices 1104 over Tx antennas 1108. Furthermore, although depicted as being separate from the processor 1114, it is to be appreciated that the access mode component 1118, training period determining component 1120, measurement receiving component 1122, access control component 1124, EIM component 1126, demodulator 1112, and/or modulator 1128 can be part of the processor 1114 or multiple processors (not shown), and/or stored as instructions in memory 1116 for execution by processor 1114.

Figure 12:
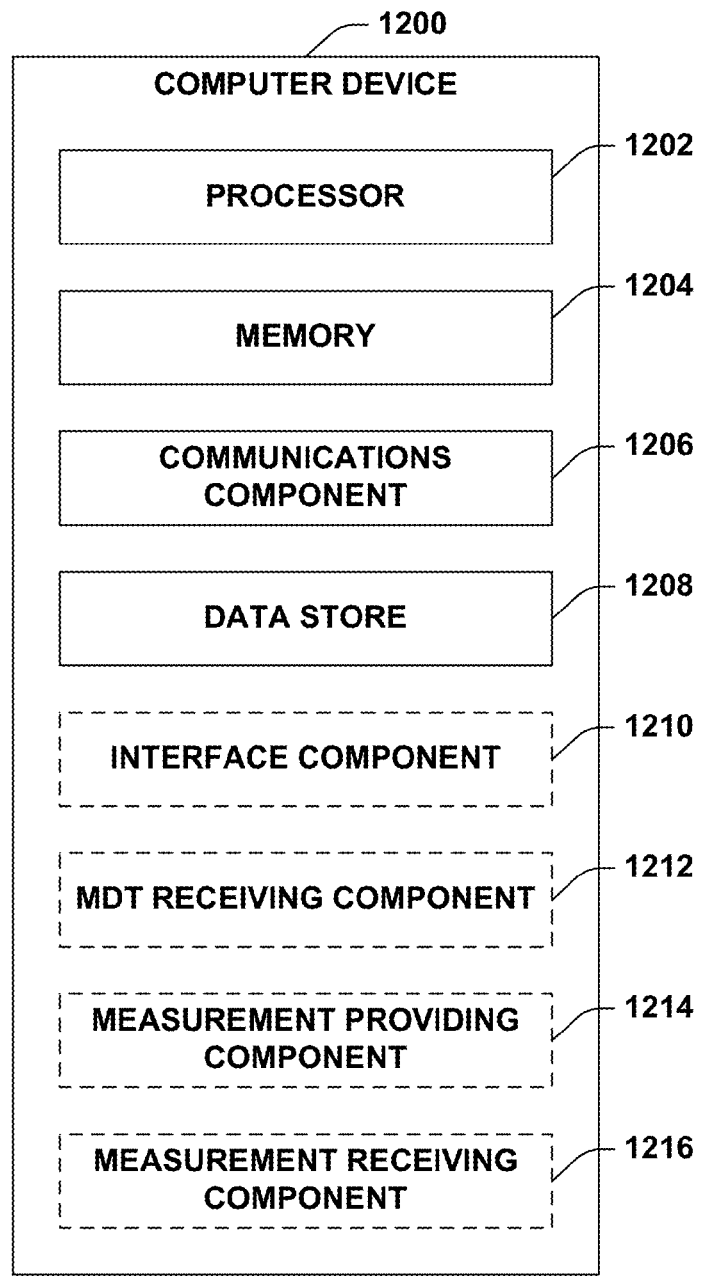
FIG. 12 is a block diagram of an example computing device according to various aspects described herein.

Referring to FIG. 12, in one aspect, any of MDT service 106 or 504, management sever 508, H(e)NB GW 306 or 406, components of CN 308 or 408, etc. (e.g., FIGS. 1 and 3-5) can be represented by and/or implemented within computer device 1200. Computer device 1200 includes a processor 1202 for carrying out processing functions associated with one or more of components and functions described herein. Processor 1202 can include a single or multiple set of processors or multi-core processors. Moreover, processor 1202 can be implemented as an integrated processing system and/or a distributed processing system.

Computer device 1200 further includes a memory 1204, such as for storing local versions of applications being executed by processor 1202. Memory 1204 can include substantially any type of memory usable by a computer, such as random access memory (RAM), read only memory (ROM), tapes, magnetic discs, optical discs, volatile memory, non-volatile memory, and any combination thereof. Computer device 1200 also includes one or more components 1206-1228, which can be stored in memory 1204, executed by processor 1202 (e.g., based on instructions stored in memory 1204), be implemented within one or more processors 1202, and/or the like.

Further, computer device 1200 includes a communications component 1206 that provides for establishing and maintaining communications with one or more parties utilizing hardware, software, and services as described herein. Communications component 1206 may carry communications between components on computer device 1200, as well as between computer device 1200 and external devices, such as devices located across a communications network and/or devices serially or locally connected to computer device 1200. For example, communications component 1206 may include one or more buses, and may further include transmit chain components and receive chain components associated with a transmitter and receiver, respectively, operable for interfacing with external devices.

Additionally, computer device 1200 may further include a data store 1208, which can be any suitable combination of hardware and/or software, that provides for mass storage of information, databases, and programs employed in connection with aspects described herein. For example, data store 1208 may be a data repository for applications not currently being executed by processor 1202.

Computer device 1200 may optionally include an interface component 1210 operable to receive inputs from a user of computer device 1200, and further operable to generate outputs for presentation to the user. Interface component 1210 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, interface component 1210 may include one or more output devices, including but not limited to a display, a speaker, a haptic feedback mechanism, a printer, any other mechanism capable of presenting an output to a user, or any combination thereof. In another example, interface component 1210 can be an application programming interface (API) that can be accessed by one or more devices to perform functions on computer device 1200.

In addition, in the depicted example, computer device 1200 can optionally include one or more of MDT receiving component 1212, which can be similar to MDT receiving component 516, measurement providing component 1214, which can be similar to measurement providing components 518 and 522, and/or measurement receiving component 1216, which can be similar to measurement receiving component 520. Thus, these components 1212, 1214, and/or 1216 can utilize processor 1202 to execute instructions associated therewith, memory 1204 to store information associated therewith, communications component 1206 to carry out communications, and/or the like, as described. In addition, it is to be appreciated that computer device 1200 can include additional or alternative components described herein.

Figure 13:
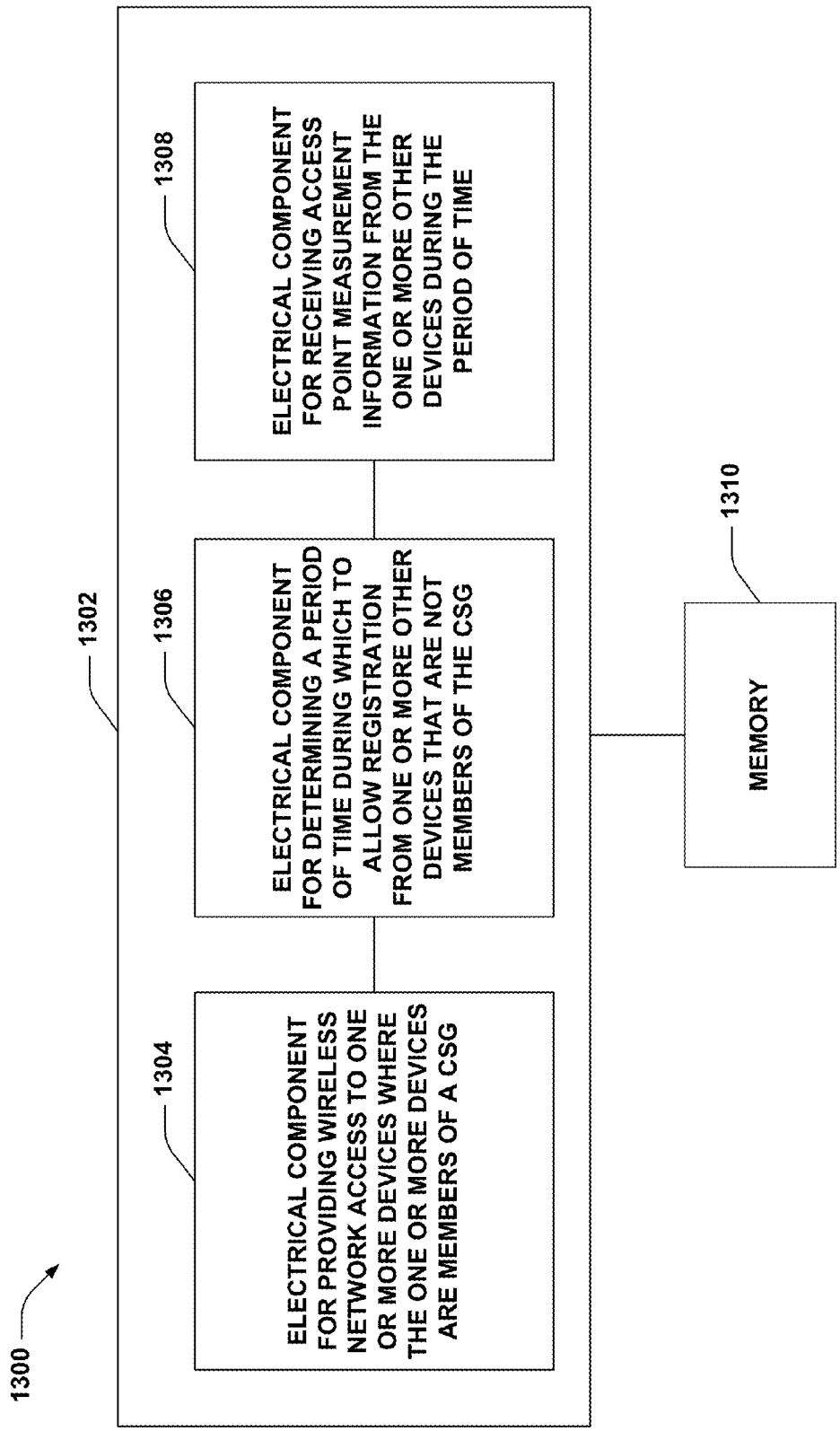
FIG. 13 is a block diagram of an example system that allows device registration to receive access point measurements.

With reference to FIG. 13, illustrated is a system 1300 that allows device registration for receiving access point measurement information. For example, system 1300 can reside at least partially within an access point, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for providing wireless network access to one or more devices where the one or more devices are members of a CSG 1304. For example, electrical component 1304 can utilize a closed access mode. Further, logical grouping 1302 can comprise an electrical component for determining a period of time during which to allow registration from one or more other devices that are not members of the CSG 1306.

For example, this can include advertising a hybrid or open access mode, as described previously. Moreover, logical grouping 1302 can include an electrical component for receiving access point measurement information from the one or more other devices during the period of time 1308. As described, for example, EIM can be performed using the access point measurement information. For example, electrical component 1304 can include an access mode component 212, as described above. In addition, for example, electrical component 1306, in an aspect, can include a training period determining component 214, as described above. Moreover, electrical component 1308 can include a measurement receiving component 216, as described. Additionally, system 1300 can include a memory 1310 that retains instructions for executing functions associated with the electrical components 1304, 1306, and 1308. While shown as being external to memory 1310, it is to be understood that one or more of the electrical components 1304, 1306, and 1308 can exist within memory 1310.

In one example, electrical components 1304, 1306, and 1308 can comprise at least one processor, or each electrical component 1304, 1306, and 1308 can be a corresponding module of at least one processor. Moreover, in an additional or alternative example, electrical components 1304, 1306, and 1308 can be a computer program product comprising a computer readable medium, where each electrical component 1304, 1306, and 1308 can be corresponding code.

Figure 14:
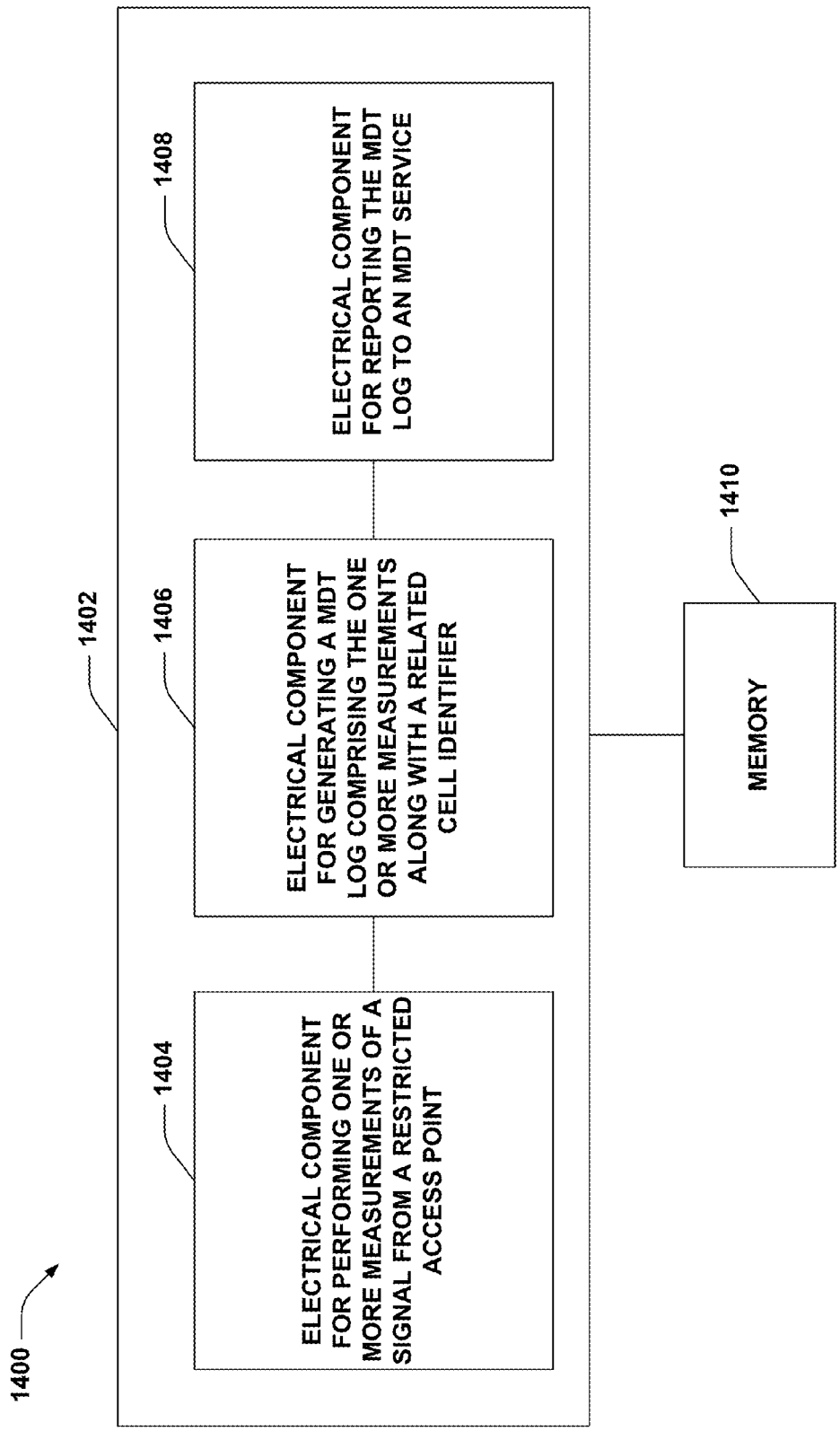
FIG. 14 is a block diagram of an example system that reports access point measurements in an MDT log.

With reference to FIG. 14, illustrated is a system 1400 that reports one or more access point measurements in an MDT log. For example, system 1400 can reside at least partially within a UE, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for performing one or more measurements of a signal from a restricted access point 1404. Further, logical grouping 1402 can comprise an electrical component for generating a MDT log comprising the one or more measurements along with a related cell identifier 1406.

For example, this can facilitate subsequent identification of the one or more measurements for providing to an access point. Moreover, logical grouping 1402 can include an electrical component for reporting the MDT log to an MDT service 1408. For example, the MDT service can then provide the measurements to related access points, as described. For example, electrical component 1404 can include an access point measuring component 510, as described above. In addition, for example, electrical component 1406, in an aspect, can include a MDT logging component 512, as described above. Moreover, electrical component 1408 can include a MDT reporting component 514, as described. Additionally, system 1400 can include a memory 1410 that retains instructions for executing functions associated with the electrical components 1404, 1406, and 1408. While shown as being external to memory 1410, it is to be understood that one or more of the electrical components 1404, 1406, and 1408 can exist within memory 1410.

In one example, electrical components 1404, 1406, and 1408 can comprise at least one processor, or each electrical component 1404, 1406, and 1408 can be a corresponding module of at least one processor. Moreover, in an additional or alternative example, electrical components 1404, 1406, and 1408 can be a computer program product comprising a computer readable medium, where each electrical component 1404, 1406, and 1408 can be corresponding code.

Figure 15:
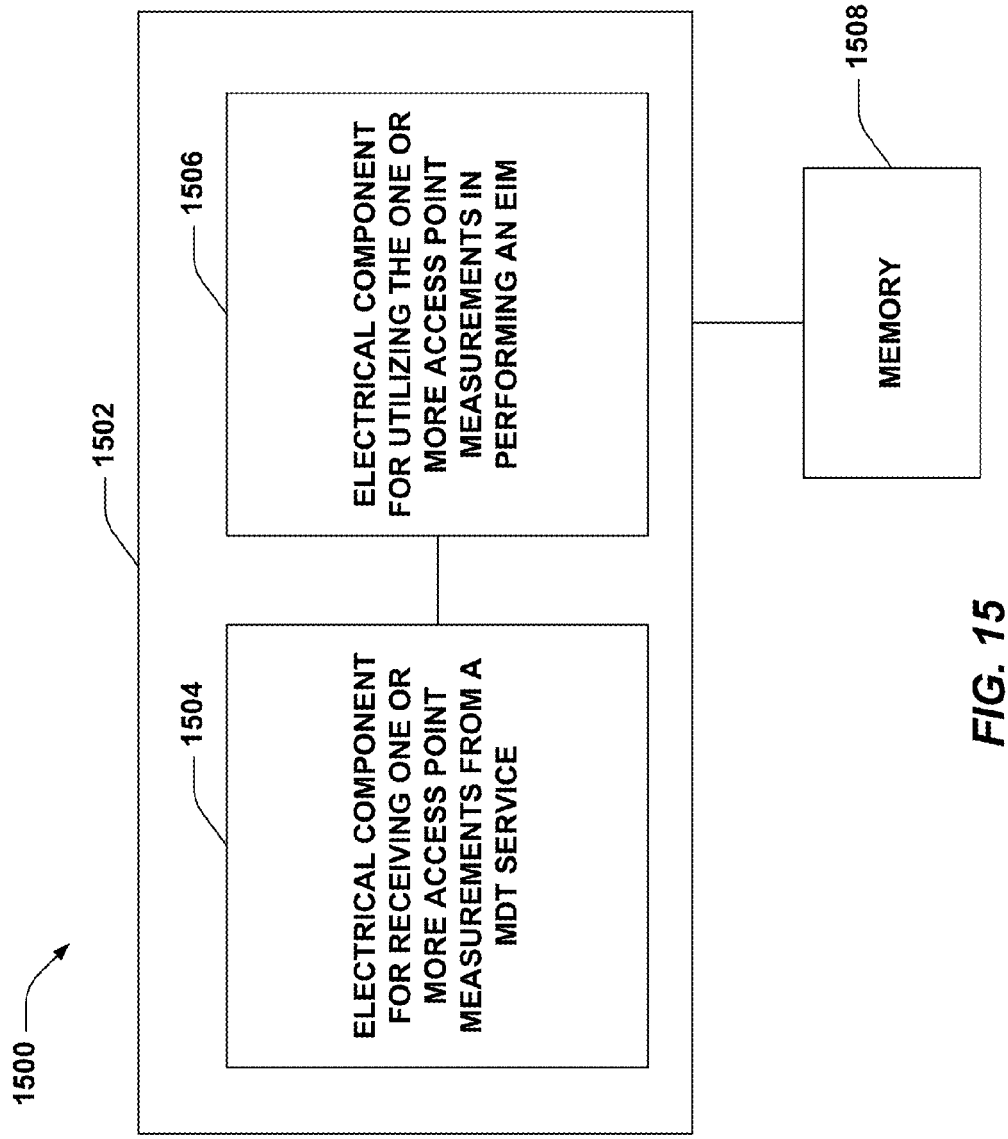
FIG. 15 is a block diagram of an example system that performs EIM based at least in part on received access point measurements.

With reference to FIG. 15, illustrated is a system 1500 for performing EIM. For example, system 1500 can reside at least partially within an access point, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for receiving one or more access point measurements from a MDT service 1504. The one or more access point measurements can be measured by a device, as described, and reported to the MDT service. Furthermore, for example, the MDT service can provide the one or more access point measurements through a management server. In addition, for example, the one or more measurements can be received based on a request for such.

Further, logical grouping 1502 can comprise an electrical component for utilizing the one or more access point measurements in performing an EIM 1506. As described, for example, one or more additional measurements can be additionally received from one or more devices that are a member of a CSG, and EIM can be further performed based at least in part on the additional measurements. For example, electrical component 1504 can include a measurement receiving component 524, as described above. In addition, for example, electrical component 1506, in an aspect, can include a EIM component 526, as described above. Additionally, system 1500 can include a memory 1508 that retains instructions for executing functions associated with the electrical components 1504 and 1506. While shown as being external to memory 1508, it is to be understood that one or more of the electrical components 1504 and 1506 can exist within memory 1508.

In one example, electrical components 1504 and 1506 can comprise at least one processor, or each electrical component 1504 and 1506 can be a corresponding module of at least one processor. Moreover, in an additional or alternative example, electrical components 1504 and 1506 can be a computer program product comprising a computer readable medium, where each electrical component 1504 and 1506 can be corresponding code.

Figure 16:
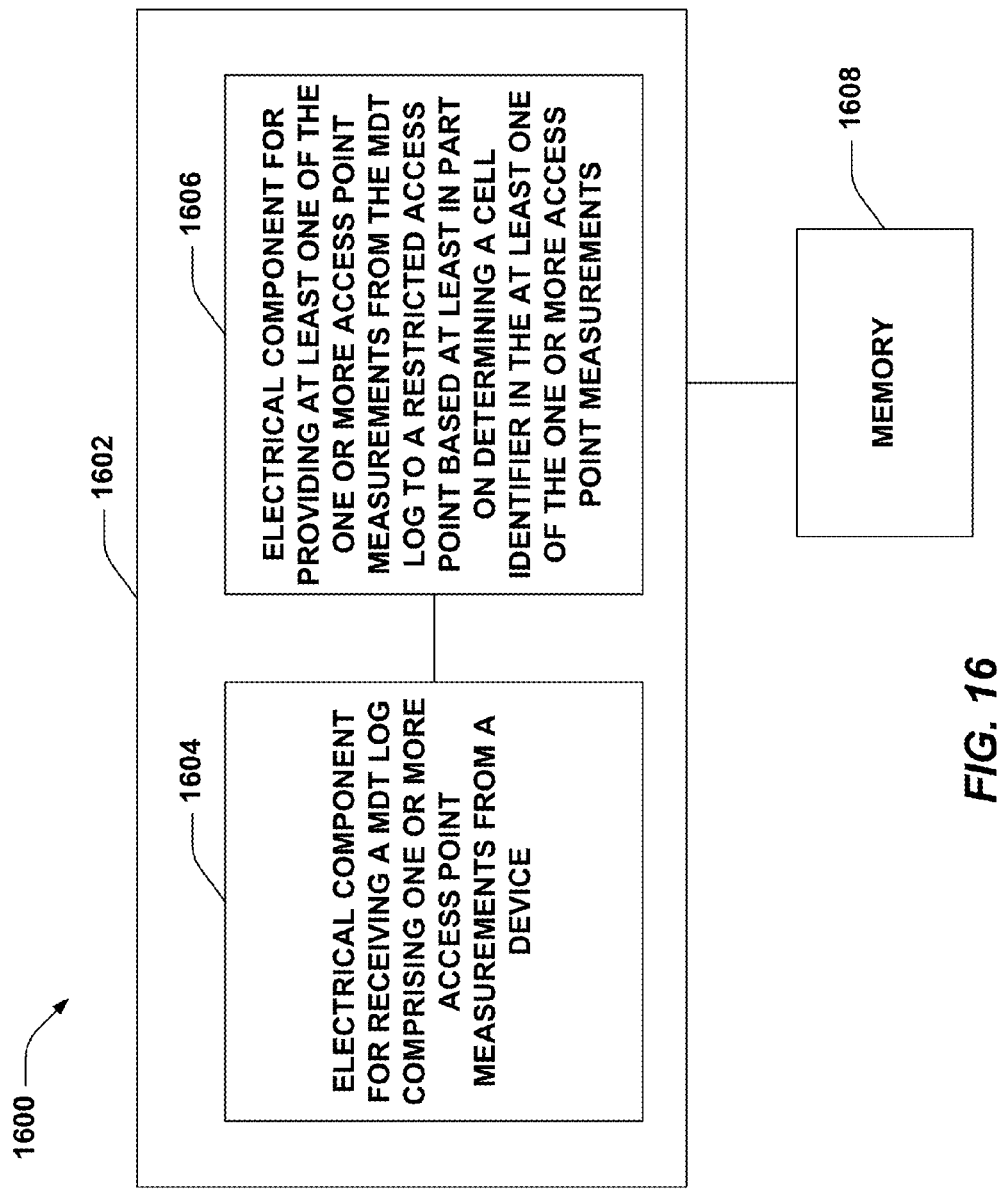
FIG. 16 is a block diagram of an example system that provides access point measurements received in an MDT log to a restricted access point.

With reference to FIG. 16, illustrated is a system 1600 that provides access point measurements from an MDT log to one or more restricted access points. For example, system 1600 can reside at least partially within a MDT service, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for receiving a MDT log comprising one or more access point measurements from a device 1604. As described, for example, the MDT log can comprise the access point measurements along with an identifier of the corresponding access point.

Further, logical grouping 1602 can comprise an electrical component for providing at least one of the one or more access point measurements from the MDT log to a restricted access point based at least in part on determining a cell identifier in the at least one of the one or more access point measurements 1606. For example, electrical component 1604 can include a measurement receiving component 520, as described above. In addition, for example, electrical component 1606, in an aspect, can include a measurement providing component 522, as described above. Additionally, system 1600 can include a memory 1608 that retains instructions for executing functions associated with the electrical components 1604 and 1606. While shown as being external to memory 1608, it is to be understood that one or more of the electrical components 1604 and 1606 can exist within memory 1608.

In one example, electrical components 1604 and 1606 can comprise at least one processor, or each electrical component 1604 and 1606 can be a corresponding module of at least one processor. Moreover, in an additional or alternative example, electrical components 1604 and 1606 can be a computer program product comprising a computer readable medium, where each electrical component 1604 and 1606 can be corresponding code.

Figure 17:
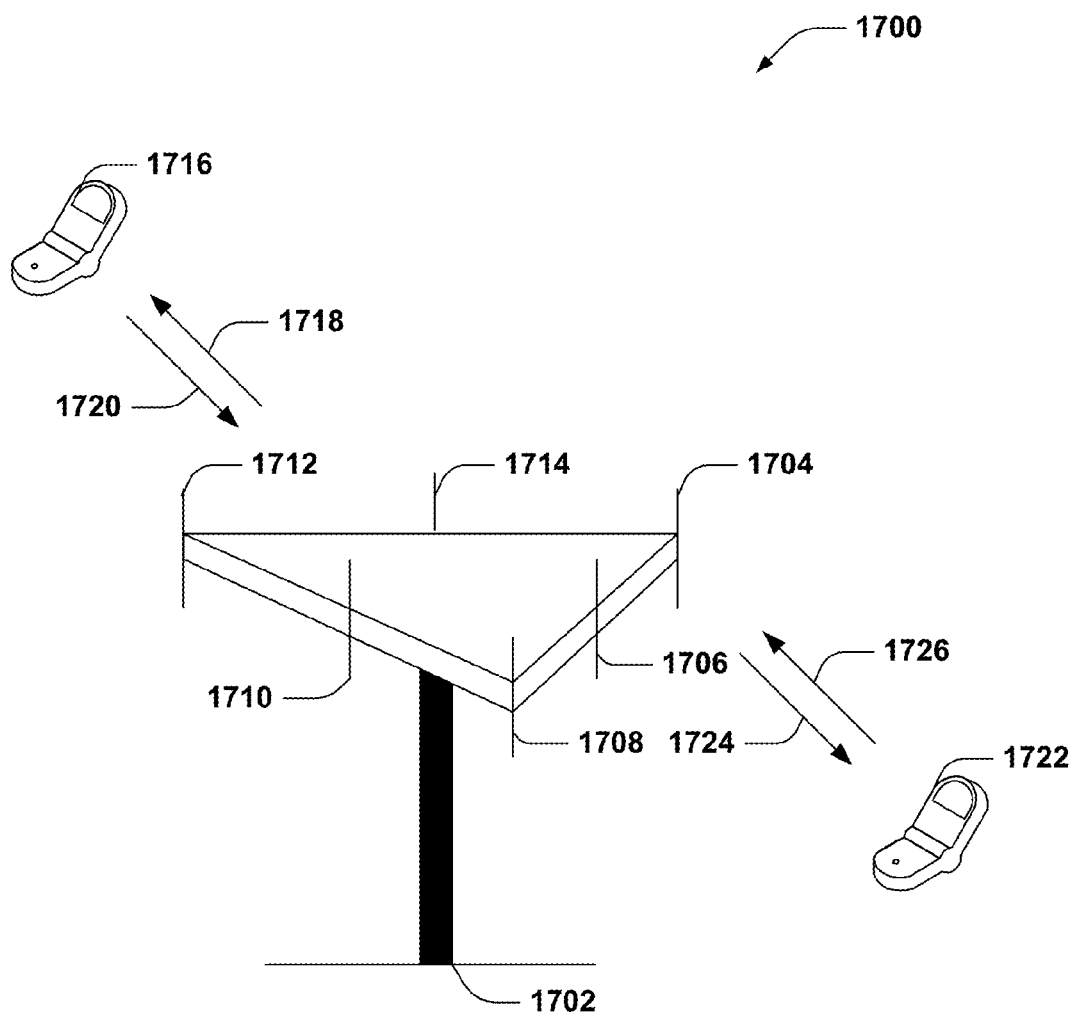
FIG. 17 is a block diagram of an example wireless communication system in accordance with various aspects set forth herein.

Referring now to FIG. 17, a wireless communication system 1700 is illustrated in accordance with various embodiments presented herein. System 1700 comprises a base station 1702 that can include multiple antenna groups. For example, one antenna group can include antennas 1704 and 1706, another group can comprise antennas 1708 and 1710, and an additional group can include antennas 1712 and 1714. Two antennas are illustrated for each antenna group; however, more or fewer antennas can be utilized for each group. Base station 1702 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1702 can communicate with one or more mobile devices such as mobile device 1716 and mobile device 1722; however, it is to be appreciated that base station 1702 can communicate with substantially any number of mobile devices similar to mobile devices 1716 and 1722. Mobile devices 1716 and 1722 can be, for example, cellular phones, smart phones, laptops, handheld communication devices, handheld computing devices, satellite radios, global positioning systems, PDAs, and/or any other suitable device for communicating over wireless communication system 1700. As depicted, mobile device 1716 is in communication with antennas 1712 and 1714, where antennas 1712 and 1714 transmit information to mobile device 1716 over a forward link 1718 and receive information from mobile device 1716 over a reverse link 1720. Moreover, mobile device 1722 is in communication with antennas 1704 and 1706, where antennas 1704 and 1706 transmit information to mobile device 1722 over a forward link 1724 and receive information from mobile device 1722 over a reverse link 1726. In a frequency division duplex (FDD) system, forward link 1718 can utilize a different frequency band than that used by reverse link 1720, and forward link 1724 can employ a different frequency band than that employed by reverse link 1726, for example. Further, in a time division duplex (TDD) system, forward link 1718 and reverse link 1720 can utilize a common frequency band and forward link 1724 and reverse link 1726 can utilize a common frequency band.

Each group of antennas and/or the area in which they are designated to communicate can be referred to as a sector of base station 1702. For example, antenna groups can be designed to communicate to mobile devices in a sector of the areas covered by base station 1702. In communication over forward links 1718 and 1724, the transmitting antennas of base station 1702 can utilize beamforming to improve signal-to-noise ratio of forward links 1718 and 1724 for mobile devices 1716 and 1722. Also, while base station 1702 utilizes beamforming to transmit to mobile devices 1716 and 1722 scattered randomly through an associated coverage, mobile devices in neighboring cells can be subject to less interference as compared to a base station transmitting through a single antenna to all its mobile devices. Moreover, mobile devices 1716 and 1722 can communicate directly with one another using a peer-to-peer or ad hoc technology as depicted. According to an example, system 1700 can be a multiple-input multiple-output (MIMO) communication system.

Figure 18:
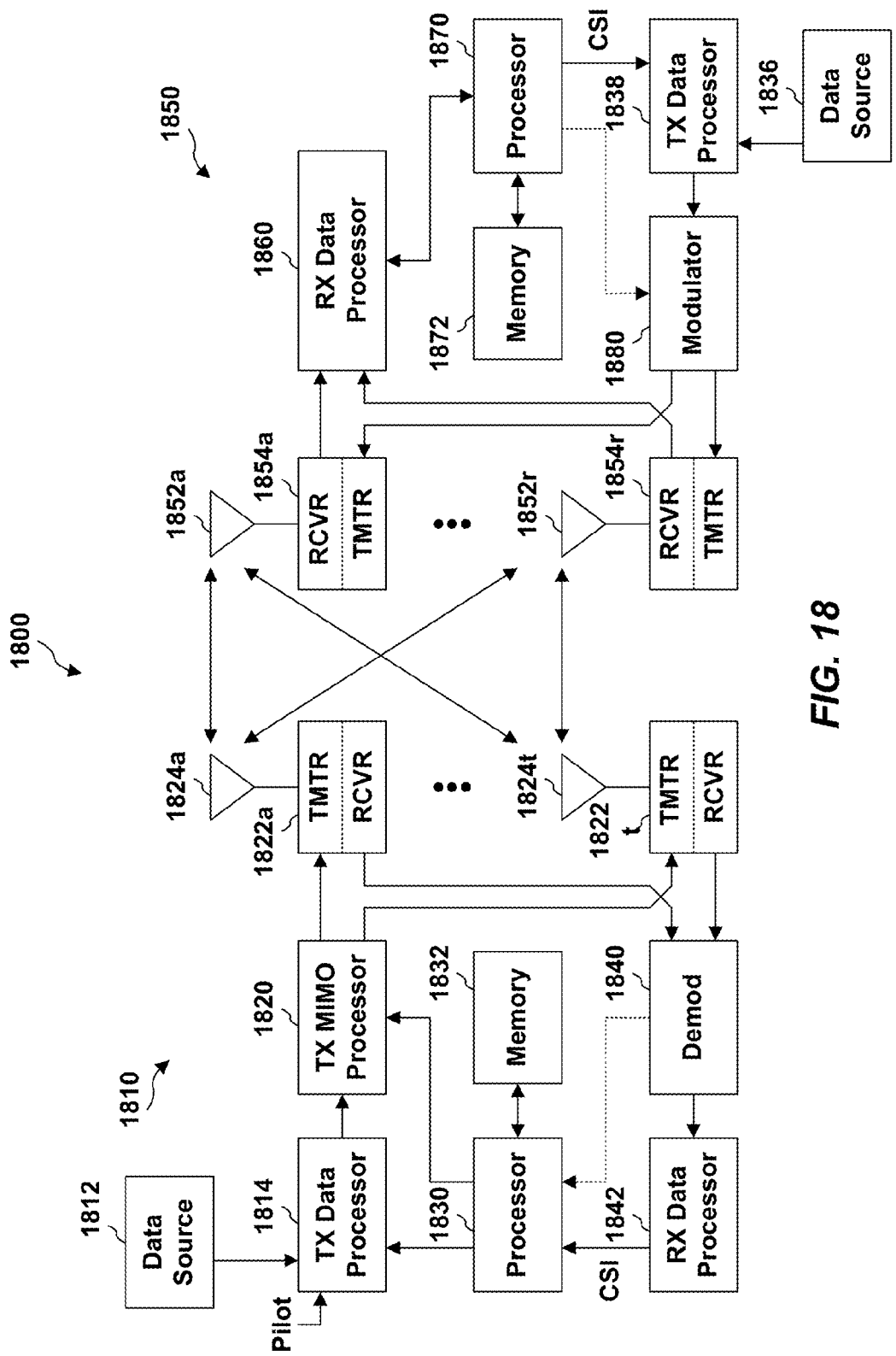
FIG. 18 is an illustration of an example wireless network environment that can be employed in conjunction with the various systems and methods described herein.

FIG. 18 shows an example wireless communication system 1800. The wireless communication system 1800 depicts one base station 1810 and one mobile device 1850 for sake of brevity. However, it is to be appreciated that system 1800 can include more than one base station and/or more than one mobile device, wherein additional base stations and/or mobile devices can be substantially similar or different from example base station 1810 and mobile device 1850 described below. In addition, it is to be appreciated that base station 1810 and/or mobile device 1850 can employ the systems (FIGS. 1-5, 11, and 13-17), mobile devices (FIG. 10), computer devices, (FIG. 12), and/or methods (FIGS. 6-9) described herein to facilitate wireless communication there between. For example, components or functions of the systems and/or methods described herein can be part of a memory 1832 and/or 1872 or processors 1830 and/or 1870 described below, and/or can be executed by processors 1830 and/or 1870 to perform the disclosed functions.

At base station 1810, traffic data for a number of data streams is provided from a data source 1812 to a transmit (TX) data processor 1814. According to an example, each data stream can be transmitted over a respective antenna. TX data processor 1814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1830.

The modulation symbols for the data streams can be provided to a TX MIMO processor 1820, which can further process the modulation symbols (e.g., for OFDM). TX MIMO processor 1820 then provides $N_T$ modulation symbol streams to $N_T$ transmitters (TMTR) 1822a through 1822t. In various embodiments, TX MIMO processor 1820 applies beamforming weights to the symbols of the data streams and to the antenna from which the symbol is being transmitted.

Each transmitter 1822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1822a through 1822t are transmitted from $N_T$ antennas 1824a through 1824t, respectively.

At mobile device 1850, the transmitted modulated signals are received by $N_R$ antennas 1852a through 1852r and the received signal from each antenna 1852 is provided to a respective receiver (RCVR) 1854a through 1854r. Each receiver 1854 conditions (e.g., filters, amplifies, and downconverts) a respective signal, digitizes the conditioned signal to provide samples, and further processes the samples to provide a corresponding "received" symbol stream.

An RX data processor 1860 can receive and process the $N_R$ received symbol streams from $N_R$ receivers 1854 based on a particular receiver processing technique to provide $N_T$ "detected" symbol streams. RX data processor 1860 can demodulate, deinterleave, and decode each detected symbol stream to recover the traffic data for the data stream. The processing by RX data processor 1860 is complementary to that performed by TX MIMO processor 1820 and TX data processor 1814 at base station 1810.

The reverse link message can comprise various types of information regarding the communication link and/or the received data stream. The reverse link message can be processed by a TX data processor 1838, which also receives traffic data for a number of data streams from a data source 1836, modulated by a modulator 1880, conditioned by transmitters 1854a through 1854r, and transmitted back to base station 1810.

At base station 1810, the modulated signals from mobile device 1850 are received by antennas 1824, conditioned by receivers 1822, demodulated by a demodulator 1840, and processed by a RX data processor 1842 to extract the reverse link message transmitted by mobile device 1850. Further, processor 1830 can process the extracted message to determine which precoding matrix to use for determining the beamforming weights.

Processors 1830 and 1870 can direct (e.g., control, coordinate, manage, etc.) operation at base station 1810 and mobile device 1850, respectively. Respective processors 1830 and 1870 can be associated with memory 1832 and 1872 that store program codes and data. Processors 1830 and 1870 can also perform computations to derive frequency and impulse response estimates for the uplink and downlink, respectively.

Figure 19:
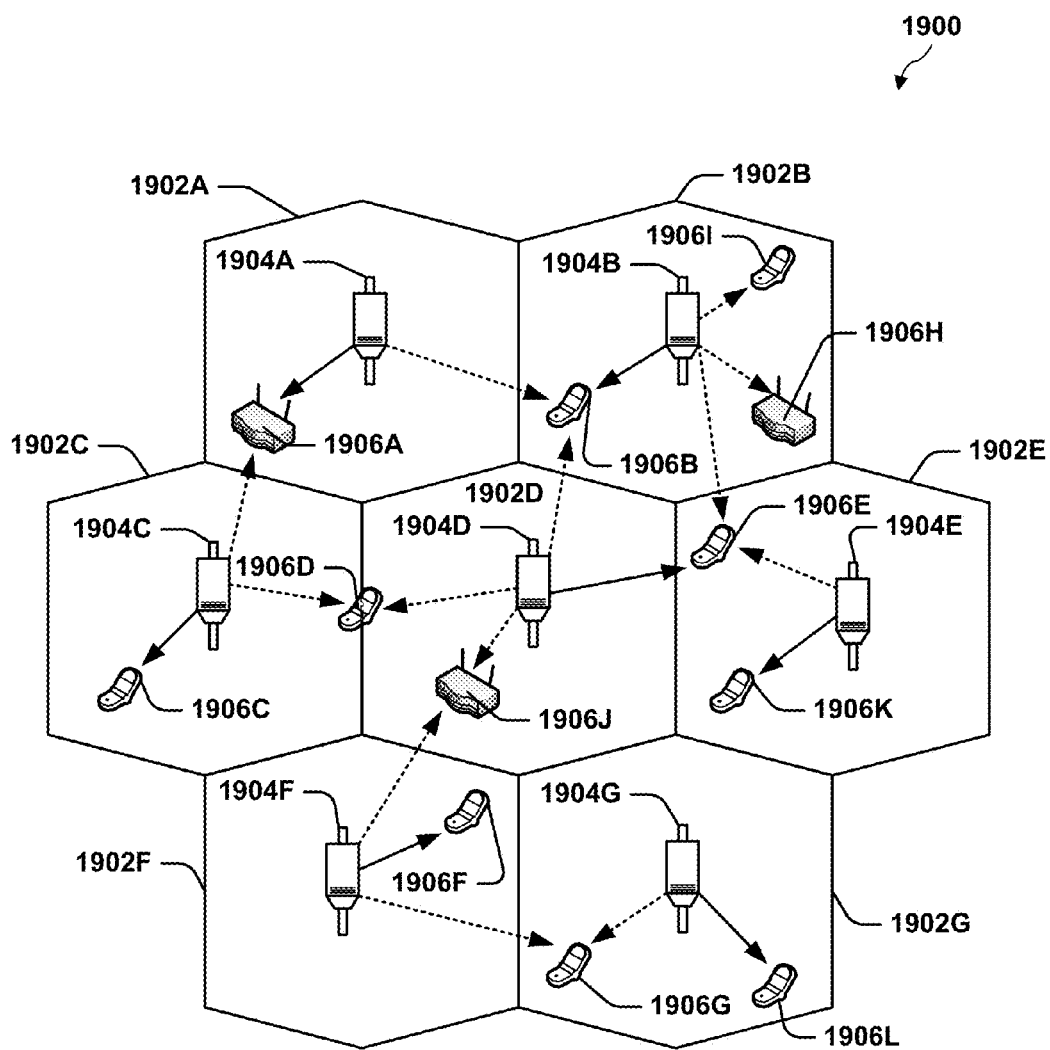
FIG. 19 illustrates an example wireless communication system, configured to support a number of devices, in which the aspects herein can be implemented.

FIG. 19 illustrates a wireless communication system 1900, configured to support a number of users, in which the teachings herein may be implemented. The system 1900 provides communication for multiple cells 1902, such as, for example, macro cells 1902A-1902G, with each cell being serviced by a corresponding access node 1904 (e.g., access nodes 1904A-1904G). As shown in FIG. 19, access terminals 1906 (e.g., access terminals 1906A-1906L) can be dispersed at various locations throughout the system over time. Each access terminal 1906 can communicate with one or more access nodes 1904 on a forward link (FL) and/or a reverse link (RL) at a given moment, depending upon whether the access terminal 1906 is active and whether it is in soft handoff, for example. The wireless communication system 1900 can provide service over a large geographic region.

Figure 20:
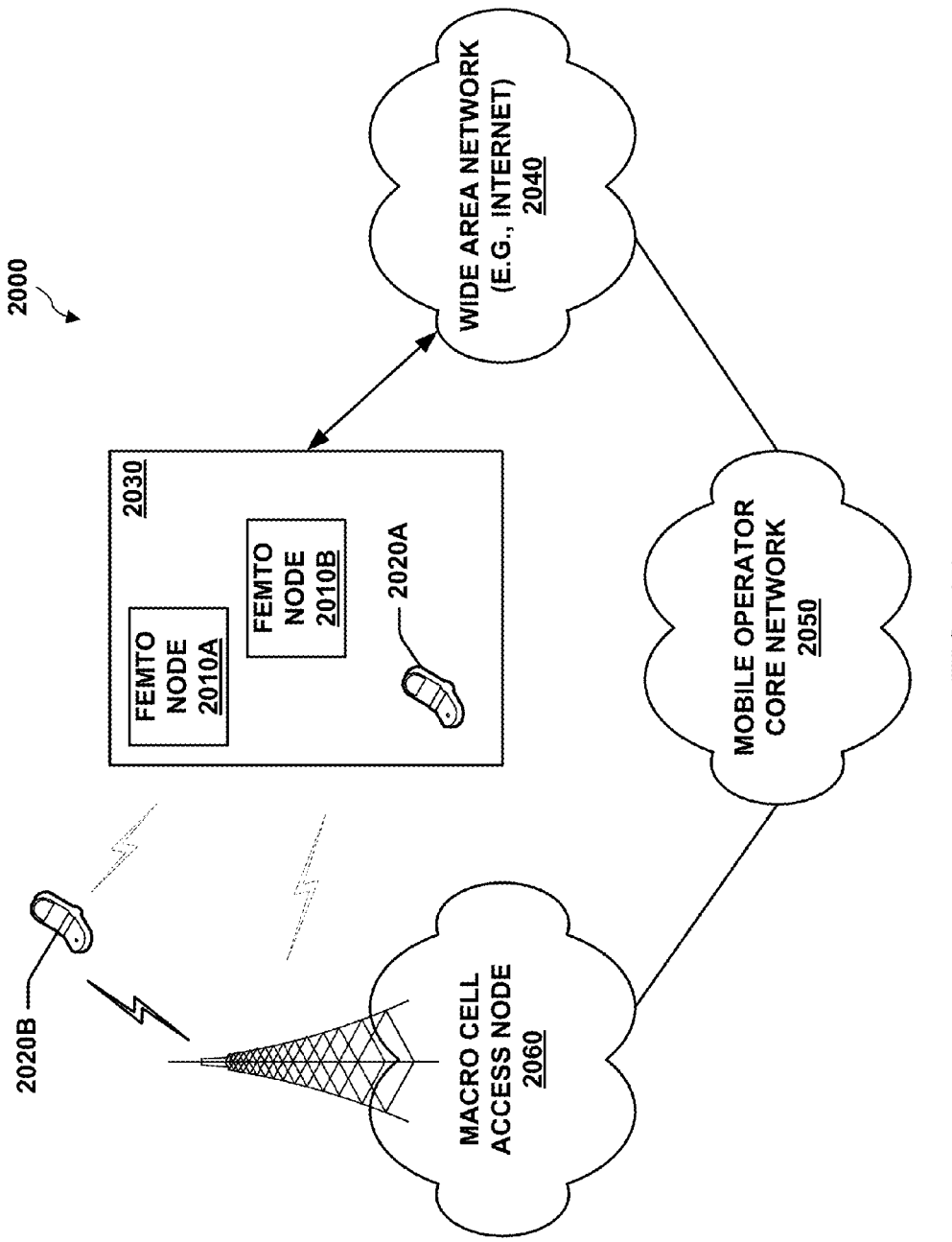
FIG. 20 is an illustration of an exemplary communication system to enable deployment of femtocells within a network environment.

FIG. 20 illustrates an exemplary communication system 2000 where one or more femto nodes are deployed within a network environment. Specifically, the system 2000 includes multiple femto nodes 2010A and 2010B (e.g., femtocell nodes or H(e)NB) installed in a relatively small scale network environment (e.g., in one or more user residences 2030). Each femto node 2010 can be coupled to a wide area network 2040 (e.g., the Internet) and a mobile operator core network 2050 via a digital subscriber line (DSL) router, a cable modem, a wireless link, or other connectivity means (not shown). As will be discussed below, each femto node 2010 can be configured to serve associated access terminals 2020 (e.g., access terminal 2020A) and, optionally, alien access terminals 2020 (e.g., access terminal 2020B). In other words, access to femto nodes 2010 can be restricted such that a given access terminal 2020 can be served by a set of designated (e.g., home) femto node(s) 2010 but may not be served by any non-designated femto nodes 2010 (e.g., a neighbor's femto node).

Figure 21:
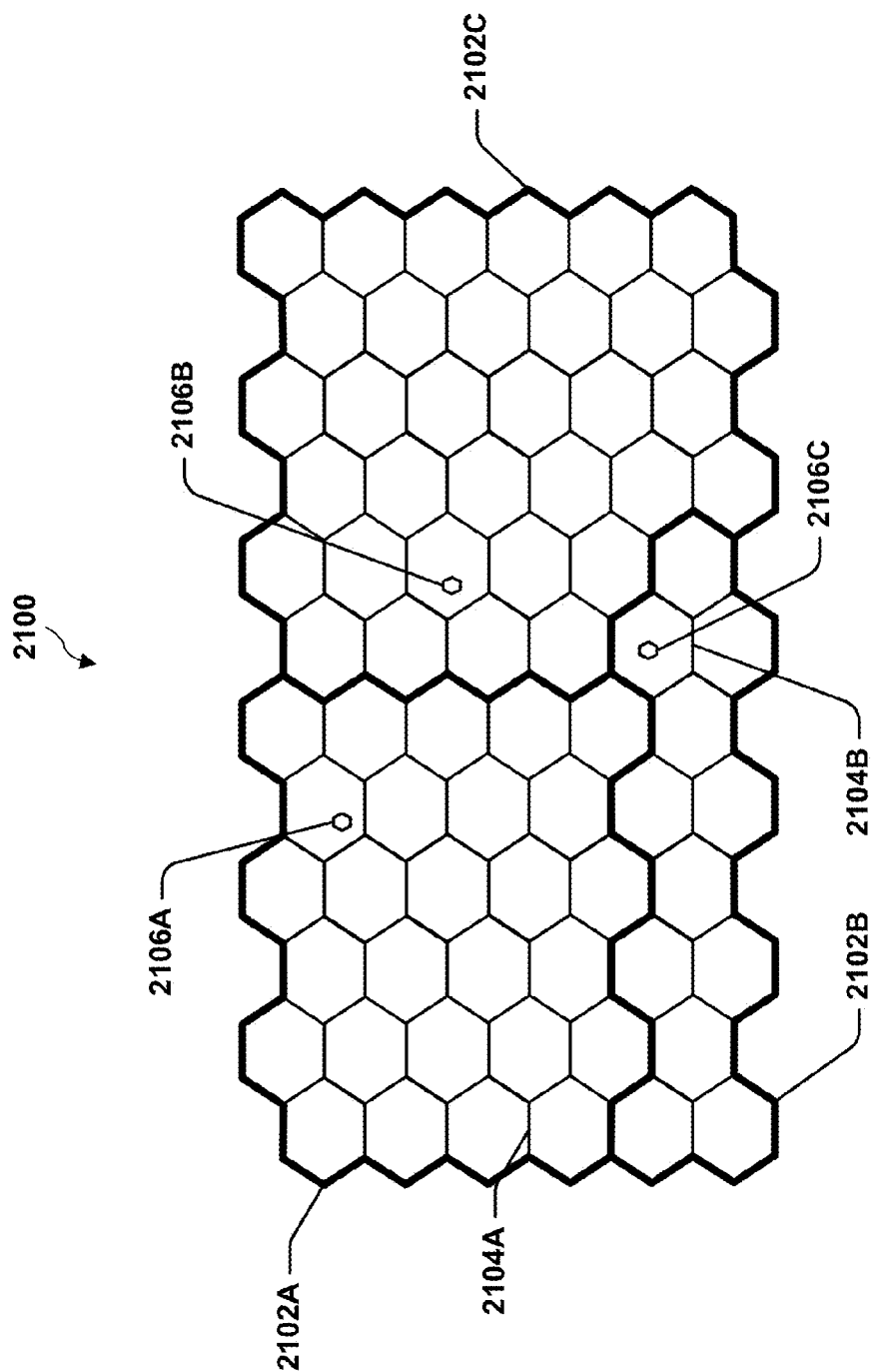
FIG. 21 illustrates an example of a coverage map having several defined tracking areas.

FIG. 21 illustrates an example of a coverage map 2100 where several tracking areas 2102 (or routing areas or location areas) are defined, each of which includes several macro coverage areas 2104. Here, areas of coverage associated with tracking areas 2102A, 2102B, and 2102C are delineated by the wide lines and the macro coverage areas 2104 are represented by the hexagons. The tracking areas 2102 also include femto coverage areas 2106. In this example, each of the femto coverage areas 2106 (e.g., femto coverage area 2106C) is depicted within a macro coverage area 2104 (e.g., macro coverage area 2104B). It should be appreciated, however, that a femto coverage area 2106 may not lie entirely within a macro coverage area 2104. In practice, a large number of femto coverage areas 2106 can be defined with a given tracking area 2102 or macro coverage area 2104. Also, one or more pico coverage areas (not shown) can be defined within a given tracking area 2102 or macro coverage area 2104.

Referring again to FIG. 20, the owner of a femto node 2010 can subscribe to mobile service, such as, for example, 3G mobile service, offered through the mobile operator core network 2050. In addition, an access terminal 2020 can be capable of operating both in macro environments and in smaller scale (e.g., residential) network environments. Thus, for example, depending on the current location of the access terminal 2020, the access terminal 2020 can be served by an access node 2060 or by any one of a set of femto nodes 2010 (e.g., the femto nodes 2010A and 2010B that reside within a corresponding user residence 2030). For example, when a subscriber is outside his home, he is served by a standard macro cell access node (e.g., node 2060) and when the subscriber is at home, he is served by a femto node (e.g., node 2010A). Here, it should be appreciated that a femto node 2010 can be backward compatible with existing access terminals 2020.

A femto node 2010 can be deployed on a single frequency or, in the alternative, on multiple frequencies. Depending on the particular configuration, the single frequency or one or more of the multiple frequencies can overlap with one or more frequencies used by a macro cell access node (e.g., node 2060). In some aspects, an access terminal 2020 can be configured to connect to a preferred femto node (e.g., the home femto node of the access terminal 2020) whenever such connectivity is possible. For example, whenever the access terminal 2020 is within the user's residence 2030, it can communicate with the home femto node 2010.

In some aspects, if the access terminal 2020 operates within the mobile operator core network 2050 but is not residing on its most preferred network (e.g., as defined in a preferred roaming list), the access terminal 2020 can continue to search for the most preferred network (e.g., femto node 2010) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 2020 can limit the search for specific band and channel. For example, the search for the most preferred system can be repeated periodically. Upon discovery of a preferred femto node, such as femto node 2010, the access terminal 2020 selects the femto node 2010 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 2010 that reside within the corresponding user residence 2030). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for reporting access point measurements, comprising:
    receiving, by a device, configuration information from a minimization of drive tests (MDT) service that identifies MDT log format and content;
    performing, by the device, one or more measurements of a signal from a first restricted access point, wherein the device is not part of a wireless cell set that can access the first restricted access point;
    generating, by the device and based on the configuration information, an MDT log comprising the one or more measurements along with a related cell identifier; and
    reporting, by the device, the MDT log to the MDT service, wherein the MDT service provides the MDT log comprising the one or more measurements to the first restricted access point.

2. The method of claim 1, wherein the generating the MDT log is based at least in part on a timer, a location, a serving cell channel quality, receiving paging signals, detecting the first restricted access point, or determining a logging storage as related to a capacity.

3. The method of claim 1, wherein the MDT service provides at least one of the one or more measurements from the MDT log to a second restricted access point based at least in part on determining a cell identifier in the at least one of the one or more measurements.

4. The method of claim 3, wherein the MDT provides the at least one of the one or more measurements based at least in part on a request from the second restricted access point for access point measurements.

5. The method of claim 4, wherein the request is received from a management server for the second restricted access point.

6. The method of claim 3, wherein the second restricted access point utilizes the one or more measurements in performing an enhanced interference management (EIM).

7. The method of claim 6, wherein the second restricted access point further receives one or more additional access point measurements from one or more devices that are a member of a closed subscriber group, and wherein the second restricted access point further utilizes the one or more additional access point measurements in performing the EIM.

8. An apparatus for reporting access point measurements, comprising:
   at least one processor configured to:
      receive configuration information from a minimization of drive tests (MDT) service that identifies MDT log format and content;
      perform one or more measurements of a signal from a first restricted access point, wherein the apparatus is not part of a wireless cell set that can access the first restricted access point;
      generate, based on the configuration information, an MDT log comprising the one or more measurements along with a related cell identifier; and
      report the MDT log to the MDT service, wherein the MDT service provides the MDT log comprising the one or more measurements to the first restricted access point; and
   a memory coupled to the at least one processor.

9. The apparatus of claim 8, wherein the at least one processor generates the MDT log based at least in part on a timer, a location, a serving cell channel quality, receiving paging signals, detecting the first restricted access point, or determining a logging storage as related to a capacity.

10. The apparatus of claim 8, wherein the MDT service provides at least one of the one or more measurements from the MDT log to a second restricted access point based at least in part on determining a cell identifier in the at least one of the one or more measurements.

11. The apparatus of claim 10, wherein the MDT provides the at least one of the one or more measurements based at least in part on a request from the second restricted access point for access point measurements.

12. The apparatus of claim 11, wherein the request is received from a management server for the second restricted access point.

13. The apparatus of claim 10, wherein the second restricted access point utilizes the one or more measurements in performing an EIM.

14. The apparatus of claim 13, wherein the second restricted access point further receives one or more additional access point measurements from one or more devices that are a member of a closed subscriber group, and wherein the second restricted access point further utilizes the one or more additional access point measurements in performing the EIM.

15. A non-transitory computer-readable medium storing computer executable instructions for reporting access point measurements comprising:
   code for causing at least one computer to receive configuration information from a minimization of drive tests (MDT) service that identifies MDT log format and content;
   code for causing the at least one computer to perform one or more measurements of a signal from a first restricted access point, wherein the computer is not part of a wireless set that can access the first restricted access point;
   code for causing the at least one computer to generate, based on the configuration information, an MDT log comprising the one or more measurements along with a related cell identifier; and
   code for causing the at least one computer to report the MDT log to the MDT service, wherein the MDT service provides the MDT log comprising the one or more measurements to the first restricted access point.

16. The computer-readable medium of claim 15, wherein the code for causing the at least one computer to generate generates the MDT log based at least in part on a timer, a location, a serving cell channel quality, receiving paging signals, detecting the first restricted access point, or determining a logging storage as related to a capacity.

17. The computer-readable medium of claim 15, wherein the MDT service provides at least one of the one or more measurements from the MDT log to a second restricted access point based at least in part on determining a cell identifier in the at least one of the one or more measurements.

18. The computer-readable medium of claim 17, wherein the MDT provides the at least one of the one or more measurements based at least in part on a request from the second restricted access point for access point measurements.

19. The computer-readable medium of claim 17, wherein the second restricted access point utilizes the one or more measurements in performing an enhanced interference management (EIM).

20. The computer-readable medium of claim 19, wherein the second restricted access point further receives one or more additional access point measurements from one or more devices that are a member of a closed subscriber group, and wherein the second restricted access point further utilizes the one or more additional access point measurements in performing the EIM.

* * * * *